US010679181B1

(12) United States Patent
Prater et al.

(10) Patent No.: US 10,679,181 B1
(45) Date of Patent: Jun. 9, 2020

(54) INVENTORY MANAGEMENT USING WEIGHT SENSORS AND PHYSICAL LAYOUT DATA

(71) Applicant: AMAZON TECHNOLOGIES, INC., Seattle, WA (US)

(72) Inventors: Alexander Clark Prater, Seattle, WA (US); Ivan Avramov, Sammamish, WA (US); Ismael Medrano, Seattle, WA (US); Benjamin Lloyd Shapiro, Seattle, WA (US); Navid Shiee, Seattle, WA (US); Brett Allen Skaloud, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/383,391

(22) Filed: Apr. 12, 2019

Related U.S. Application Data

(63) Continuation of application No. 14/747,553, filed on Jun. 23, 2015, now Pat. No. 10,262,293.

(51) Int. Cl.
G06Q 10/08 (2012.01)
G06N 5/04 (2006.01)

(52) U.S. Cl.
CPC ............ G06Q 10/087 (2013.01); G06N 5/04 (2013.01)

(58) Field of Classification Search
CPC ...... G06Q 20/00; G06Q 20/208; G06Q 20/20; G06Q 90/00; G06K 7/14; G06K 9/98; G06K 7/10861
USPC .......... 705/14.64, 23, 323; 235/375, 462.08; 702/150; 384/150; 382/100
See application file for complete search history.

(56) References Cited

U.S. PATENT DOCUMENTS

| 4,891,755 | A | * | 1/1990 | Asher ................. G01G 19/414 177/210 R |
|---|---|---|---|---|
| 7,225,980 | B2 | | 6/2007 | Ku et al. |
| 7,949,568 | B2 | | 5/2011 | Fano et al. |
| 8,009,864 | B2 | | 8/2011 | Linaker et al. |
| 8,189,855 | B2 | | 5/2012 | Opalach et al. |
| 8,442,878 | B2 | | 5/2013 | Henry |
| 8,447,069 | B2 | | 5/2013 | Huang et al. |
| 8,630,924 | B2 | | 1/2014 | Groenevelt et al. |

(Continued)

OTHER PUBLICATIONS

Asthana, "An Indoor Wireless System for Personalized Shopping Assistance", CiteSeerX, In Proceedings of IEEE Workshop on Mobile Computing Systems and Applications, 1994, 6 pages. Retrieved from the Internet: URL:http://citeseerx.ist.psu.edu/viewdoc/summary?doi=10.1.1.127.3303.

(Continued)

Primary Examiner — Olusegun Goyea
(74) Attorney, Agent, or Firm — Linauer Law, PLLC

(57) ABSTRACT

An inventory location, such as a shelf, may be used to stow different items. The shelf is divided into a plurality of adjacent lanes, some of which may be grouped into a cluster. Items are placed upon the lanes of the cluster. Each lane includes one or more weight sensors to obtain weight data about a load on the lane. Based on the weight data and physical layout data for the shelf, one or more hypotheses may be determined for describing interactions, such as a pick or place of an item, occurring at the lanes of a cluster. One of the hypotheses may be selected as a solution for describing the interaction and used to maintain inventory quantities of items at the shelf.

20 Claims, 10 Drawing Sheets

(56) References Cited

U.S. PATENT DOCUMENTS

| | | |
|---|---|---|
| 9,235,928 B2 | 1/2016 | Medioni et al. |
| 9,813,605 B2 | 11/2017 | Peterson et al. |
| 2003/0078693 A1 | 4/2003 | Chavez et al. |
| 2003/0179294 A1 | 9/2003 | Martins |
| 2005/0060246 A1 | 3/2005 | Lastinger et al. |
| 2005/0073585 A1 | 4/2005 | Ettinger et al. |
| 2005/0190072 A1 | 9/2005 | Brown et al. |
| 2006/0071774 A1 | 4/2006 | Brown et al. |
| 2007/0050271 A1* | 3/2007 | Ufford ............ G06Q 10/087 705/28 |
| 2009/0222359 A1 | 9/2009 | Henry |
| 2011/0011936 A1 | 1/2011 | Morandi et al. |
| 2012/0284132 A1 | 11/2012 | Kim et al. |
| 2013/0223673 A1* | 8/2013 | Davis ................. G06K 9/78 382/100 |
| 2013/0284806 A1 | 10/2013 | Margalit |
| 2013/0290106 A1* | 10/2013 | Bradley ............. G06Q 90/20 705/14.64 |
| 2014/0052555 A1* | 2/2014 | MacIntosh ......... G07G 1/0036 705/23 |
| 2014/0074762 A1* | 3/2014 | Campbell ........... G06Q 40/00 706/46 |
| 2014/0379296 A1* | 12/2014 | Nathan ............. G06Q 10/08 702/150 |
| 2015/0086107 A1 | 3/2015 | Dedeoglu et al. |
| 2015/0178654 A1 | 6/2015 | Glasgow et al. |
| 2015/0310601 A1* | 10/2015 | Rodriguez .......... G06K 9/209 348/150 |
| 2016/0026032 A1* | 1/2016 | Moore ............ G06K 7/10316 382/103 |

OTHER PUBLICATIONS

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambent_devices_to_deliver_salient_information_in_supermarkets.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

* cited by examiner

INVENTORY MANAGEMENT USING WEIGHT SENSORS AND PHYSICAL LAYOUT DATA

PRIORITY

This application is a continuation of, and claims priority to, U.S. patent application Ser. No. 14/747,553, filed on Jun. 23, 2015 entitled "Item Management System Using Multiple Scales", which is hereby incorporated by reference in its entirety.

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
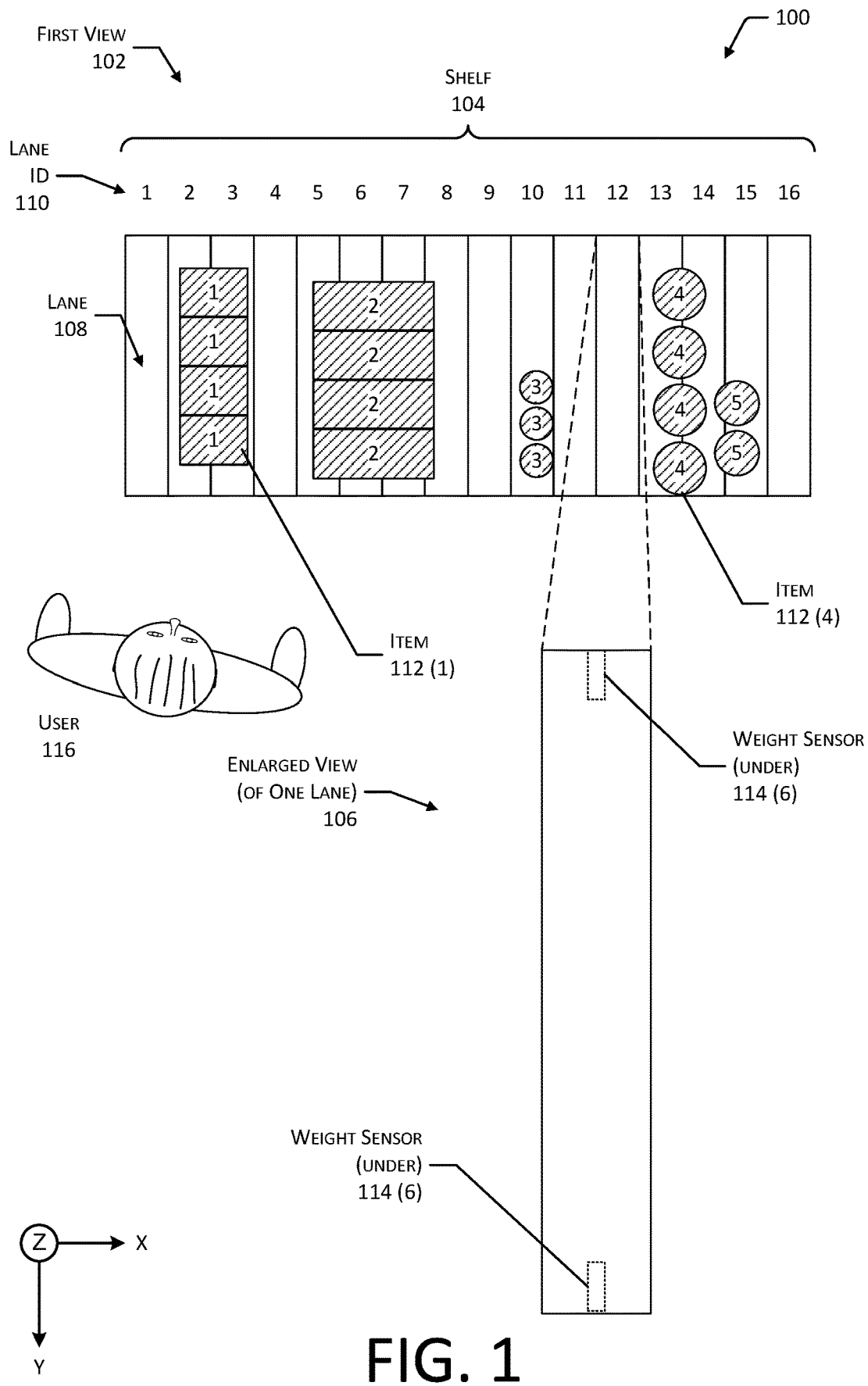
FIG. 1 illustrates several views of an inventory location comprising a shelf with multiple lanes, each lane having a weight sensor to generate weight sensor data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for determining interactions with items stowed in inventory locations in a materials handling facility (facility) or other settings. For example, interactions may comprise the user picking an item from an inventory location, placing an item at an inventory location, touching an item, and so forth.

The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

Operation of the facility may be facilitated by using one or more sensors to acquire information about interactions in the facility. The inventory management system may process the sensor data from the one or more sensors to determine interaction data. For example, the inventory management system may use the interaction data to determine a type of item a user picked from a particular inventory location, to adjust the count of inventory stowed at the particular inventory location, and so forth.

Described are devices and techniques for gathering and processing weight sensor data from one or more weight sensors. The weight sensors may be used to gather weight sensor data about items stowed at an inventory location, such as a shelf.

Each shelf may comprise a plurality of lanes that are arranged adjacent to one another. Each lane is coupled to a weight sensor that provides information about the weight of a load on that particular lane. The load may comprise any object that imposes a weight onto at least a portion of the particular lane, such as items, support structure, and so forth. One or more types of items may be arranged on the shelf. Items may span two or more lanes. For example, the shelf may have a total width of about 48 inches wide, and may include 16 lanes, with each lane about 3 inches wide. Items may rest on the shelf, supported by two or more lanes. For example, an item 2 inches wide may be resting half on one lane, half on another lane. In another example, an item 10 inches wide may be supported by 4 lanes.

Items may be arranged in columns on the shelf, with the columns running front to back. Each column may store a different type of item. For example, one column may be Brand A dog food, another column may be Brand X cat food, and so forth. During use of the facility, items may be added to or removed from the shelf. For example, some users may pick items from the shelf while other users may place items on the shelf to restock.

As items are added to or removed from the shelf, the weight at the different lanes on that shelf may change. For example, addition or removal of an item may cause a change in weight across several lanes. The amount of weight change may vary depending upon how much support a particular lane provided to the item. For example, removal of an item that weights 300 grams and rests halfway on a first lane and halfway on a second lane will result in a weight change of −150 grams on the first lane and −150 grams on the second lane.

The weight sensor data may be processed to generate weight characteristic data. The processing may include utilizing one or more filters or analysis techniques. For example, the weight sensor data may be processed with an exponential moving average function to generate filtered weight sensor data. The filtered weight sensor data may be processed to generate weight characteristic data. The weight characteristic data may include one or more of a measured weight at a lane at a particular time, measured weight change data at a lane from a first time to a second time, weight distribution indicative of an arrangement of weight across a plurality of lanes, and so forth.

The inventory management system may generate or access hypotheses that describe various predicted combinations of types of items, quantity changes, location on the shelf, and so forth. The hypotheses may be based on item data, physical layout data, one or more constraints, and so forth. Item data may indicate the items that are expected to be stored at that particular shelf, weight of those items, and the location on the shelf where the column is arranged. The physical layout data may provide information indicative of where an inventory location is located in the facility, physical configuration of the inventory location, and so forth. For example, the physical layout data may indicate which lanes are adjacent to one another at a particular shelf, and relative positions thereof such as which lane is on the left and which lane is on the right.

These hypotheses may be compared with measured weight characteristic data to determine if one or more of the hypotheses are a solution indicative of what happened during an interaction. In some implementations, the correspondence of the predicted values of the hypotheses to the measured values may be used to generate a score. Various techniques may be used to generate the score such as an expected weight scorer, edge penalty scorer, penalized weight scorer, transaction count scorer, and so forth. The solution may then be determined based on the score. Once the solution has been determined, the predicted values described in that hypotheses may be deemed to accurately reflect the interaction and may be used to generate the interaction data. For example, if the solution describes a prediction that 2 cans of dog food were removed from the shelf, the interaction may be deemed to involve removal of 2 cans of dog food from the shelf.

The inventory management system may use the interaction data to maintain item data about the items in the facility. For example, the interaction data may indicate that a quantity of one can of Brand A dog food was removed from the shelf. Responsive to this, the inventory management system may decrease the quantity of Brand A dog food on hand at that shelf by one.

By using the devices and techniques described herein, operation of the facility may be improved. Details about interactions between users and items in the facility may be quickly and accurately determined. For example, as items are picked, placed, touched, and so forth, information such as inventory levels or metrics about touch may be readily determined. As a result, the inventory management system may be able to quickly track what item a user has interacted with, maintain up-to-date item data, and so forth.

Illustrative System

FIG. 1 illustrates several overhead views 100 of an inventory location. A first view 102 depicts a shelf 104 while an enlarged view 106 depicts a portion of the shelf 104. With respect to the first view 102, the shelf 104 is depicted as having 16 lanes 108. In other implementations, a larger or smaller number of lanes 108 may be implemented. For ease of illustration, and not necessarily by way of limitation, each lane 108 is assigned a lane ID 110, numbered 1-16 and ordered left to right. The lanes 108 are adjacent to one another, such that one lane 108 is next to at least one other lane 108. For example, lane 1 is adjacent to lane 2.

The lane 108 may be constructed to provide a relatively flat surface upon which one or more items 112 may rest. As depicted in the enlarged view 106, one or more weight sensors 114(6) may be arranged beneath the lane 108. In this illustration, a pair of weight sensors 114(6) may be arranged at each end of the lane 108. In other implementations, the placement of the weight sensor 114(6) may change, and so forth. The weight sensors 114(6) generate weight sensor data indicative of a load on that particular lane 108. The load may include the items 112, a support structure, and so forth. Items 112 may span or extend across two or more lanes 108. A group of the same type of item 112 may be arranged as depicted in columns along the lanes 108. For example, a group of the type of items 112(1) includes items 112 that span lanes 2 and 3, while a group of the type of items 112(2) spans lanes 5, 6, 7, and 8.

While the shelf 104 is depicted as having a rectangular shape when viewed from above, in other implementations, the shelf 104 may be arranged with lanes 108 in other configurations. In one implementation the shelf 104 may describe an arc or an angle. For example, the shelf 104 may be configured to extend around a corner, such as on a curved end-cap of the aisle. In another implementation the shelf 104 may be arranged to form a square corner.

The surface of the shelf 104 allows a user 116 to place items 112 on the shelf 104 in whatever arrangement is desired. For example, a planogram provided by an operator of a facility may set forth a particular arrangement of the items 112 on the shelf 104. Without regard to the location of the underlying lanes 108, the user 116 may configure the items 112 on the shelf 104 in accord with the planogram. As illustrated here, items 112 need not be constrained to a single lane 108. Even though a particular item 112 may have a geometry allowing it to fit within a single lane 108, the item 112 may not be constrained to placement within a single lane 108. For example, the items 112(5) are arranged such that they span lanes 14 and 15. Once configured, information about the ultimate arrangement of the items 112 on the shelf 104 may be stored as item data for use as described herein.

Figure 2:
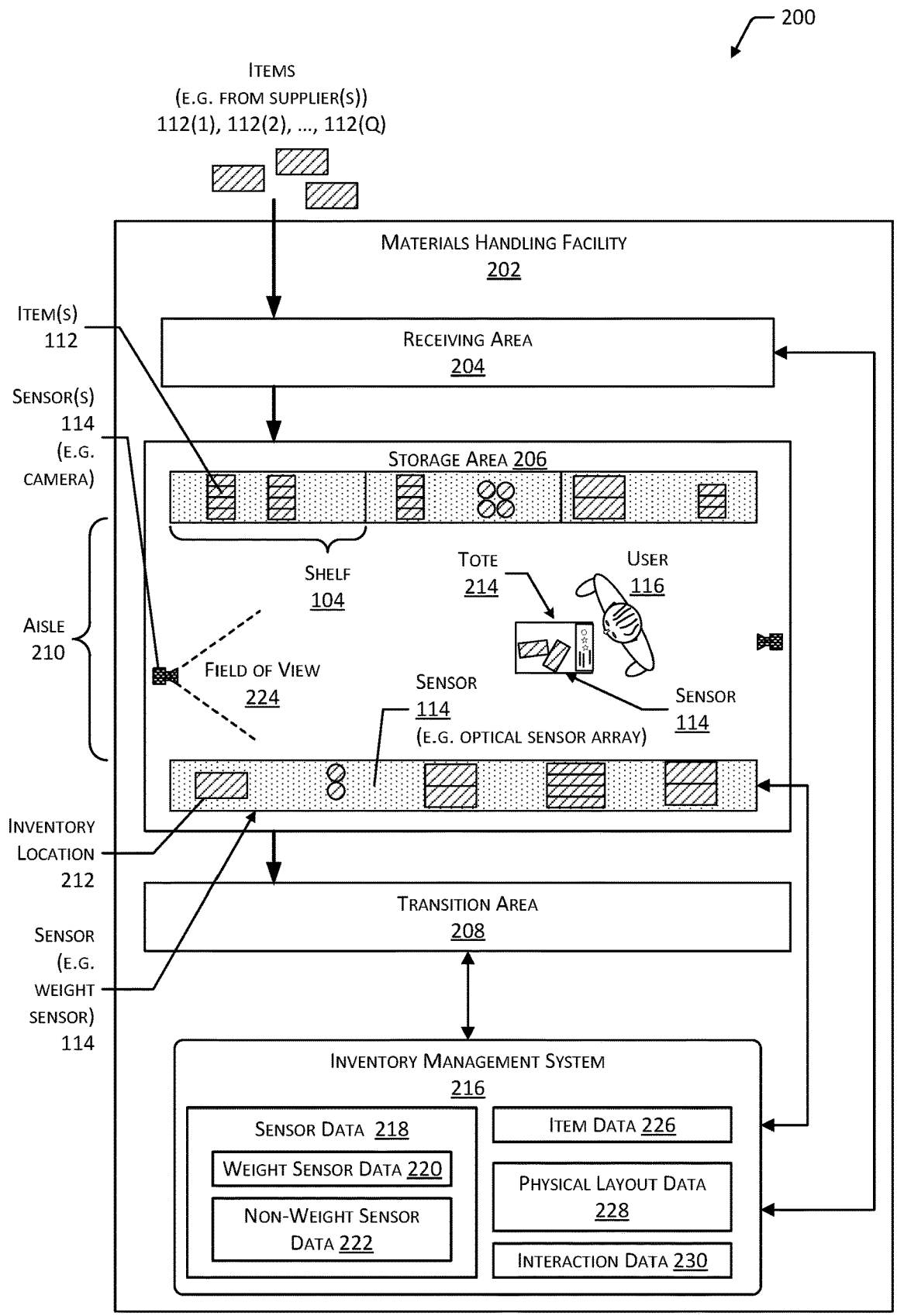
FIG. 2 is a block diagram illustrating a materials handling facility (facility) having weight sensors, according to some implementations.

An implementation of a materials handling system 200 configured to store and manage inventory items is illustrated in FIG. 2. A materials handling facility 202 (facility) comprises one or more physical structures or areas within which one or more items 112(1), 112(2), . . . , 112(Q) may be held. As used in this disclosure, letters in parenthesis such as "(Q)" indicate an integer value greater than or equal to zero. The items 112 comprise physical goods, such as books, pharmaceuticals, repair parts, electronic gear, and so forth.

The facility 202 may include one or more areas designated for different functions with regard to inventory handling. In this illustration, the facility 202 includes a receiving area 204, a storage area 206, and a transition area 208.

The receiving area 204 may be configured to accept items 112, such as from suppliers, for intake into the facility 202. For example, the receiving area 204 may include a loading dock at which trucks or other freight conveyances unload the items 112.

The storage area 206 is configured to store the items 112. The storage area 206 may be arranged in various physical configurations. In one implementation, the storage area 206 may include one or more aisles 210. The aisle 210 may be configured with, or defined by, inventory locations 212 on one or both sides of the aisle 210. The inventory locations 212 may include one or more of a shelf 104, a rack, a case, a cabinet, a bin, a floor location, or other suitable storage mechanisms for holding, supporting, or storing the items 112. The inventory locations 212 may be affixed to the floor or another portion of the facility's 202 structure. The inventory locations 212 may also be movable such that the arrangement of aisles 210 may be reconfigurable. In some implementations, the inventory locations 212 may be configured to move independently of an outside operator. For example, the inventory locations 212 may comprise a rack with a power source and a motor, operable by a computing device to allow the rack to move from one location within the facility 202 to another.

One or more users 116(1), 116(2), . . . , 116(U) and totes 214(1), 214(2), . . . , 214(T) or other material handling apparatus may move within the facility 202. For example, the user 116 may move about within the facility 202 to pick or place the items 112 in various inventory locations 212, placing them on the tote 214 for ease of transport. The tote 214 is configured to carry or otherwise transport one or more items 112. For example, the tote 214 may include a basket, cart, bag, bin, and so forth. In other implementations, other material handling apparatuses such as robots, forklifts, cranes, aerial drones, and so forth, may move about the facility 202 picking, placing, or otherwise moving the items 112. For example, a robot may pick an item 112 from a first inventory location 212(1) and move the item 112 to a second inventory location 212(2).

One or more sensors 114 may be configured to acquire information in the facility 202. The sensors 114 may include, but are not limited to, cameras 114(1), three-dimensional (3D) sensors 114(2), weight sensors 114(6), optical sensor arrays 114(13), proximity sensors 114(14), and so forth. The sensors 114 may be stationary or mobile, relative to the facility 202. For example, the inventory locations 212 may contain weight sensors 114(6) to acquire weight sensor data of items 112 stowed therein, cameras 114(1) to acquire images of picking or placement of items 112 on shelves, optical sensor arrays 114(13) to detect shadows of the user's 116 hands at the inventory locations 212, and so forth. In another example, the facility 202 may include cameras to obtain images of the user 116 or other objects in the facility 202. The sensors 114 are discussed in more detail below with regard to FIG. 3.

While the storage area 206 is depicted as having one or more aisles 210, inventory locations 212 storing the items 112, sensors 114, and so forth, it is understood that the receiving area 204, the transition area 208, or other areas of the facility 202 may be similarly equipped. Furthermore, the arrangement of the various areas within the facility 202 is depicted functionally rather than schematically. For example, in some implementations, multiple different receiving areas 204, storage areas 206, and transition areas 208 may be interspersed rather than segregated in the facility 202.

The facility 202 may include, or be coupled to, an inventory management system 216. The inventory management system 216 is configured to interact with users 116 or devices such as sensors 114, robots, material handling equipment, computing devices, and so forth, in one or more of the receiving area 204, the storage area 206, or the transition area 208.

During operation of the facility 202, the sensors 114 may be configured to provide sensor data 218, or information based on the sensor data 218, to the inventory management system 216. The sensor data 218 may include weight sensor data 220 obtained from weight sensors 114(6), non-weight sensor data 222 obtained from other sensors 114 such as cameras 114(1), 3D sensors 114(2), optical sensor arrays 114(13), proximity sensors 114(14), and so forth. The sensors 114 are described in more detail below.

The weight sensor data 220 comprises data generated by one or more weight sensors 114(6). The weight sensors 114(6) may be incorporated into an inventory location 212 that stows the items 112. For example, the inventory location 212 may comprise one or more shelves 104. Each shelf 104 may, in turn, comprise a plurality of adjacent lanes 108 or platforms, with each lane 108 having one or more weight sensors 114(6). By reading one or more characteristics of a load cell, the weight of the load on a particular lane may be determined. The load cell uses electronic, optical, acoustic, or other effects to determine the magnitude of a load applied thereto. For example, an electronic load cell may utilize changes in electrical resistance, capacitance, or inductance to determine weight. In another example, an optical load cell may use changes in the transmittance of light, such as in an optical fiber or other waveguide, to determine weight. Continuing the example, the optical fiber may be affixed to a support structure, and the deformation of the structure and corresponding movement of the fiber responsive to a change in the weight of a load on that support structure may be used to generate weight data based on measurement of the Fiber Bragg Grating effect. In another example, acoustic measurement may utilize one or more transducers to introduce sound waves into at least a portion of the load cell and then read out how the transmission of that sound is changed. For example, a change in the phase or amplitude of the received sound may be used to determine weight on the load cell. In other implementations the weight sensor 114(6) may comprise a force sensitive resistor (FSR) or other material. The FSR may comprise a resilient material, such as foam, that exhibits changes in one or more electrical characteristics when compressed. The FSR may be utilized in a variety of configurations. For example, the FSR may be used as a load cell, or may be arranged across the entire surface of the lane.

The weight sensor data 220 from each lane may be processed by the inventory management system 216 to determine what items 112 have been picked or placed, quantities involved, and so forth. Features of the shelf 104 are discussed in more detail below with regard to FIGS. 6-8.

The non-weight sensor data 222 may comprise data generated by the non-weight sensors 114, such as cameras 114(1), 3D sensors 114(2), buttons 114(3), touch sensors 114(4), microphones 114(5), optical sensors 114(7), RFID readers 114(8), RF receivers 114(9), accelerometers 114(10), gyroscopes 114(11), magnetometers 114(12), optical sensor arrays 114(13), proximity sensors 114(14), and so forth. For example, cameras 114(1) may be arranged to have a field of view (FOV) 224 that includes at least a portion of the inventory location 212. Continuing the example, the camera 114(1) may be mounted above the inventory location 212 with the FOV 224 oriented to where the items 112 may be stowed during use of the inventory location 212.

The inventory management system 216 or other systems may use the sensor data 218 to track the location of objects within the facility 202, movement of the objects, or provide other functionality. Objects may include, but are not limited to, items 112, users 116, totes 214, and so forth. For example, a series of images acquired by the camera 114(1) may indicate removal by the user 116 of an item 112 from a particular location on the inventory location 212 and placement of the item 112 on or at least partially within the tote 214.

The facility 202 may be configured to receive different kinds of items 112 from various suppliers and to store them until a customer orders or retrieves one or more of the items 112. A general flow of items 112 through the facility 202 is indicated by the arrows of FIG. 2. Specifically, as illustrated in this example, items 112 may be received from one or more suppliers, such as manufacturers, distributors, wholesalers, and so forth, at the receiving area 204. In various implementations, the items 112 may include merchandise, commodities, perishables, or any suitable type of item 112, depending on the nature of the enterprise that operates the facility 202.

Upon being received from a supplier at the receiving area 204, the items 112 may be prepared for storage in the storage area 206. For example, in some implementations, items 112 may be unpacked or otherwise rearranged. The inventory management system 216 may include one or more software applications executing on a computer system to provide inventory management functions. These inventory management functions may include maintaining information indicative of the type, quantity, condition, cost, location, weight, or any other suitable parameters with respect to the items 112. The items 112 may be stocked, managed, or dispensed in terms of countable units, individual units, or multiple units, such as packages, cartons, crates, pallets, or other suitable aggregations. Alternatively, some items 112, such as bulk products, commodities, and so forth, may be stored in continuous or arbitrarily divisible amounts that may not be-inherently organized into countable units. Such items 112 may be managed in terms of a measurable quantity such as units of length, area, volume, weight, time, duration, or other dimensional properties characterized by units of measurement. Generally speaking, a quantity of an item 112 may refer to either a countable number of individual or aggregate units of an item 112 or a measurable amount of an item 112, as appropriate.

After arriving through the receiving area 204, items 112 may be stored within the storage area 206. In some implementations, like items 112 may be stored or displayed together in the inventory locations 212 such as in bins, on shelves, hanging from pegboards, and so forth. In this implementation, all items 112 of a given kind are stored in one inventory location 212. In other implementations, like items 112 may be stored in different inventory locations 212. For example, to optimize retrieval of certain items 112 having frequent turnover within a large physical facility 202, those items 112 may be stored in several different inventory locations 212 to reduce congestion that might occur at a single inventory location 212.

When a customer order specifying one or more items 112 is received, or as a user 116 progresses through the facility 202, the corresponding items 112 may be selected or "picked" from the inventory locations 212 containing those items 112. In various implementations, item picking may range from manual to completely automated picking. For example, in one implementation, a user 116 may have a list of items 112 they desire and may progress through the facility 202 picking items 112 from inventory locations 212 within the storage area 206 and placing those items 112 into a tote 214. In other implementations, employees of the facility 202 may pick items 112 using written or electronic pick lists derived from customer orders. These picked items 112 may be placed into the tote 214 as the employee progresses through the facility 202.

After items 112 have been picked, the items 112 may be processed at a transition area 208. The transition area 208 may be any designated area within the facility 202 where items 112 are transitioned from one location to another or from one entity to another. For example, the transition area 208 may be a packing station within the facility 202. When the item 112 arrives at the transition area 208, the items 112 may be transitioned from the storage area 206 to the packing station. Information about the transition may be maintained by the inventory management system 216.

In another example, if the items 112 are departing the facility 202, a list of the items 112 may be obtained and used by the inventory management system 216 to transition responsibility for, or custody of, the items 112 from the facility 202 to another entity. For example, a carrier may accept the items 112 for transport with that carrier accepting responsibility for the items 112 indicated in the list. In another example, a user 116 may purchase or rent the items 112 and remove the items 112 from the facility 202. During use of the facility 202, the user 116 may move about the facility 202 to perform various tasks, such as picking or placing the items 112 in the inventory locations 212.

To facilitate operation of the facility 202, the inventory management system 216 is configured to use the sensor data 218, item data 226, physical layout data 228, and so forth, to generate interaction data 230. The item data 226 provides information about a particular item 112, characteristics of that type of item 112, where that type of item 112 is located in the facility 202, and so forth. For example, the item data 226 may indicate the types and quantities of items 112 that are expected to be stored at that particular inventory location 212 such as a shelf 104, the location on the shelf 104 where the column is stowed, weight of those items 112 individually or in aggregate, and so forth. The item data 226 may include information such as an item identifier, item weight data, weight distribution, geometry data, shelf location identifiers, quantity data, and so forth. The item data 226 is described in more detail below with regard to FIG. 5.

The physical layout data 228 may provide information indicative of where an inventory location 212 is located in the facility 202, physical configuration of the inventory location 212, and so forth. For example, the physical layout data 228 may indicate that inventory location 212(37) comprises a shelf 104 with 16 lanes 108, the lanes 108 ordered 1 to 16 as viewed left to right, and so forth. The physical layout data 228 is described in more detail below with regard to FIG. 5.

The interaction data 230 may provide information about an interaction, such as a pick of an item 112 from the inventory location 212, a place of an item 112 to the inventory location 212, a touch made to an item 112 at the inventory location 212, a gesture associated with an item 112 at the inventory location 212, and so forth. The interaction data 230 may include one or more of the type of interaction, inventory location identifier indicative of where from the inventory location 212 the interaction took place, item identifier, quantity change to the item 112, user identifier, and so forth. The interaction data 230 may then be used to further update the item data 226. For example, the quantity of items 112 on hand at a particular location on the shelf 104 may be changed based on an interaction that picks or places one or more items 112.

The inventory management system 216 may use the sensor data 218 to determine the interaction. Weight characteristics about an interaction may be determined using the weight sensor data 220 obtained from weight sensors 114(6) of the lanes 108 in the shelf 104. These weight characteristics may include weight before an interaction, weight after an interaction, weight change during a period of time, change in distribution of weight, and so forth.

In some implementations, a single inventory location 212 such as a shelf 104 may stow several different types of items 112, with each type of item 112 arranged in columns on the shelf 104. The inventory management system 216 may use the weight sensor data 220 to determine weight characteristics, and use those weight characteristics to identify the item 112 that was picked or placed. The weight characteristics may include the change in measured weight at several different lanes 108 during a particular period of time. The item data 226 may be retrieved that indicates weight of individual items 112, width of an item 112, where the item 112 is supposed to be stowed on at the inventory location 212, and so forth. The physical layout data 228 may be used to determine which lanes 108 and corresponding weight sensors 114(6) are under the location where the item 112 is to be stowed.

Based on the item data 226, the physical layout data 228, and so forth, hypotheses may be generated that describe different or particular combinations of predicted actions. In some implementations, these hypotheses may be precomputed or otherwise generated in advance. These hypotheses may include predicted weight characteristic data for these different or particular combinations. The measured weight characteristics may be compared with the predicted weight characteristics of the hypotheses and used to determine a solution. Once a solution is determined, the predicted identity of the item(s) 112 involved, quantities, and so forth, may be determined to be indicative of the actual interaction that took place. The predicted values of the solution may then be used to change item data 226 such as a quantity on hand at a particular inventory location 212 or position therein. For example, if the hypothesis selected as a solution indicates three cans of dog food were picked from the inventory location 212, the quantity on hand for dog food at that inventory location 212 may be decreased by a quantity of three.

In some implementations, other non-weight sensor data 222 may be processed and used to select a particular hypothesis. For example, non-weight sensor data 222 such as images acquired from cameras may be processed and used to determine motion at particular inventory locations 212 or portions of the inventory locations 212. This motion data may then be used to select or discard hypotheses.

In some implementations, the hypotheses may be selected based at least in part on a score. The scores may be determined by the degree of correspondence between the sensor data 218, or information based thereon, and the predicted values of the hypotheses. A higher score may be indicative of a closer correspondence between the predicted values and the measured data. For example, a high scoring hypothesis may predict values of a change in one or more weight characteristics that are within 5% of the measured weight sensor data 220, while a lower scoring hypothesis may have values that are within 20% of the measured weight sensor data 220.

The process of using the weight sensor data 220 to generate interaction data 230 is discussed in more detail below. For example, FIGS. 8-10 describe various processes for determining a hypothesis based on information derived from weight sensor data 220.

In some implementations, items 112 may be processed, such as at the receiving area 204, to generate at least a portion of the item data 226. For example, an item 112 not previously stored by the inventory management system 216 may be measured to determine geometry such as external dimensions, assigned to a particular inventory location 212, and so forth, as part of a process to receive the item 112 into the facility 202. Continuing the example, the item data 226 generated may include acquiring the weight of a single item 112, information about weight distribution of the item 112, and so forth.

By using the weight sensor data 220 obtained from the various weight sensors 114(6) in the lanes 108 of the shelf 104, and in some implementations, in conjunction with the non-weight sensor data 222, the inventory management system 216 is able to maintain item data 226 such as inventory levels of a particular item 112 at a particular inventory location 212, generate billing information without manual intervention by a user 116, or provide other functions. For example, the user 116 may pick an item 112 from the inventory location 212. Using the interaction data 230 based on the sensor data 218 and in conjunction with the item data 226, the inventory management system 216 may correctly determine that a quantity of one can of dog food has been picked, and bill the user 116 accordingly for the sale price of the item 112.

Figure 3:
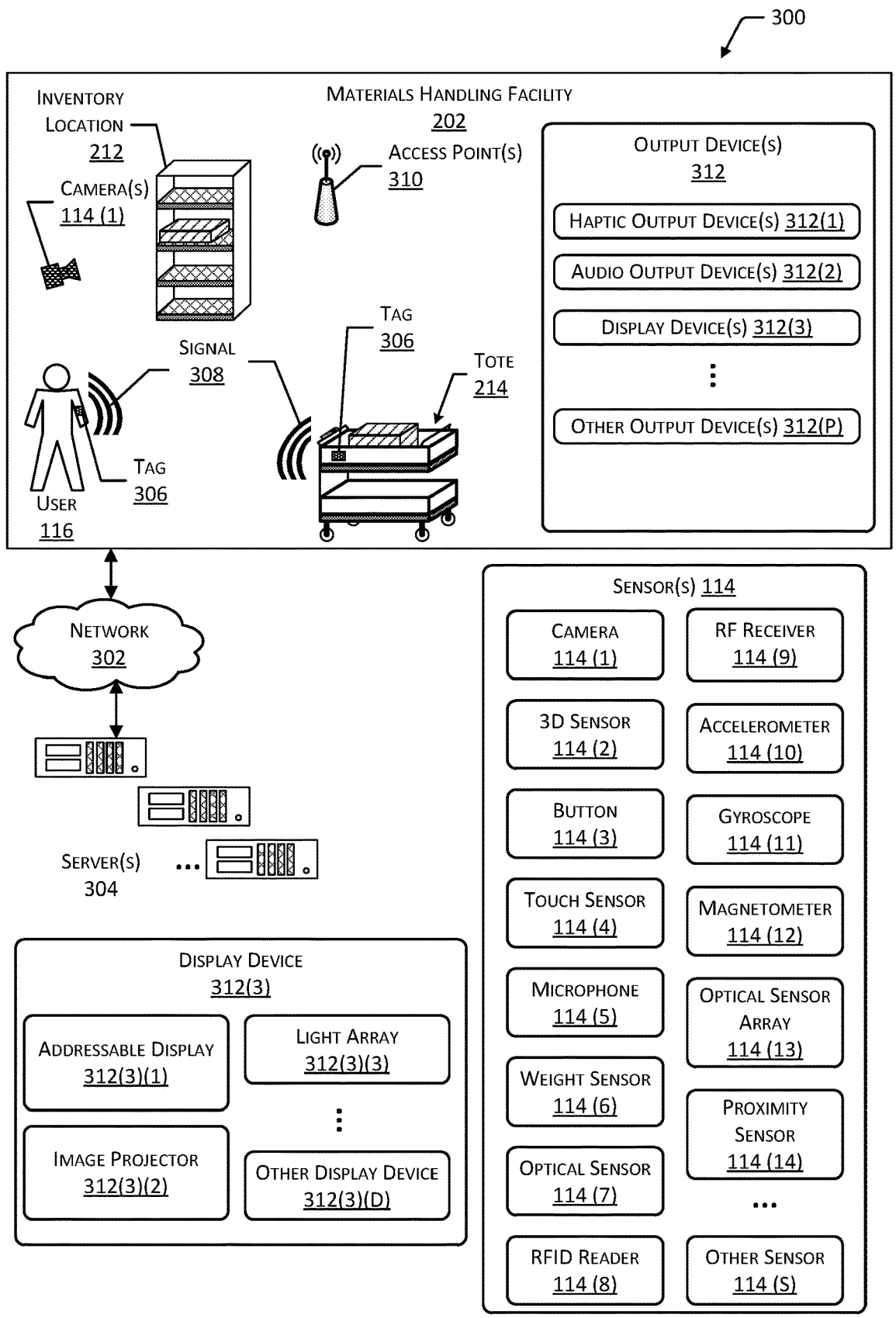
FIG. 3 is a block diagram illustrating additional details of the facility, according to some implementations.

FIG. 3 is a block diagram 300 illustrating additional details of the facility 202, according to some implementations. The facility 202 may be connected to one or more networks 302, which in turn connect to one or more servers 304. The network 302 may include private networks such as an institutional or personal intranet, public networks such as the Internet, or a combination thereof. The network 302 may utilize wired technologies (e.g., wires, fiber optic cables, and so forth), wireless technologies (e.g., radio frequency, infrared, acoustic, optical, and so forth), or other connection technologies. The network 302 is representative of any type of communication network, including one or more of data networks or voice networks. The network 302 may be implemented using wired infrastructure (e.g., copper cable, fiber optic cable, and so forth), a wireless infrastructure (e.g., cellular, microwave, satellite, and so forth), or other connection technologies.

The servers 304 may be configured to execute one or more modules or software applications associated with the inventory management system 216 or other systems. While the servers 304 are illustrated as being in a location outside of the facility 202, in other implementations, at least a portion of the servers 304 may be located at the facility 202. The servers 304 are discussed in more detail below with regard to FIG. 4.

The users 116, the totes 214, or other objects in the facility 202 may be equipped with one or more tags 306. The tags 306 may be configured to emit a signal 308. In one implementation, the tag 306 may be a radio frequency identification (RFID) tag configured to emit a RF signal 308 upon activation by an external signal. For example, the external signal may comprise a radio frequency signal or a magnetic field configured to energize or activate the RFID tag 306. In another implementation, the tag 306 may comprise a transmitter and a power source configured to power the transmitter. For example, the tag 306 may comprise a Bluetooth Low Energy (BLE) transmitter and battery. In other implementations, the tag 306 may use other techniques to indicate presence of the tag 306. For example, an acoustic tag 306 may be configured to generate an ultrasonic signal 308, which is detected by corresponding acoustic receivers. In yet another implementation, the tag 306 may be configured to emit an optical signal 308.

The inventory management system 216 may be configured to use the tags 306 for one or more of identification of the object, determining a location of the object, and so forth. For example, the users 116 may wear tags 306, the totes 214 may have tags 306 affixed, and so forth, which may be read and, based at least in part on signal strength, used to determine identity and location.

Generally, the inventory management system 216 or other systems associated with the facility 202 may include any number and combination of input components, output components, and servers 304.

The one or more sensors 114 may be arranged at one or more locations within the facility 202. For example, the sensors 114 may be mounted on or within a floor, wall, at a ceiling, at an inventory location 212, on a tote 214, may be carried or worn by a user 116, and so forth.

The sensors 114 may include one or more cameras 114(1) or other imaging sensors. The one or more cameras 114(1) may include imaging sensors configured to acquire images of a scene. The cameras 114(1) are configured to detect light in one or more wavelengths including, but not limited to, terahertz, infrared, visible, ultraviolet, and so forth. The cameras 114(1) may comprise charge coupled devices (CCD), complementary metal oxide semiconductor (CMOS) devices, microbolometers, and so forth. The inventory management system 216 may use image data acquired by the cameras 114(1) during operation of the facility 202. For example, the inventory management system 216 may identify items 112, users 116, totes 214, and so forth, based at least in part on their appearance within the image data acquired by the cameras 114(1). The cameras 114(1) may be mounted in various locations within the facility 202. For example, cameras 114(1) may be mounted overhead, on inventory locations 212, may be worn or carried by users 116, may be affixed to totes 214, and so forth.

One or more 3D sensors 114(2) may also be included in the sensors 114. The 3D sensors 114(2) are configured to acquire spatial or 3D data, such as depth information, about objects within a FOV 224 of a sensor 114. The 3D sensors 114(2) may include range cameras, lidar systems, sonar systems, radar systems, structured light systems, stereo vision systems, optical interferometry systems, and so forth. The inventory management system 216 may use the 3D data acquired by the 3D sensors 114(2) to identify objects, determine a location of an object in 3D real space, and so forth.

One or more buttons 114(3) may be configured to accept input from the user 116. The buttons 114(3) may comprise mechanical, capacitive, optical, or other mechanisms. For example, the buttons 114(3) may comprise mechanical switches configured to accept an applied force from a touch of the user 116 to generate an input signal. The inventory management system 216 may use data from the buttons 114(3) to receive information from the user 116. For example, the tote 214 may be configured with a button 114(3) to accept input from the user 116 and send information indicative of the input to the inventory management system 216.

The sensors 114 may include one or more touch sensors 114(4). The touch sensors 114(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 216 may use data from the touch sensors 114(4) to receive information from the user 116. For example, the touch sensor 114(4) may be integrated with the tote 214 to provide a touchscreen with which the user 116 may select from a menu one or more particular items 112 for picking, enter a manual count of items 112 at an inventory location 212, and so forth.

One or more microphones 114(5) may be configured to acquire information indicative of sound present in the environment. In some implementations, arrays of microphones 114(5) may be used. These arrays may implement beamforming techniques to provide for directionality of gain. The inventory management system 216 may use the one or more microphones 114(5) to acquire information from acoustic tags 306, accept voice input from the users 116, determine ambient noise level, and so forth.

One or more weight sensors 114(6) are configured to measure the weight of a load, such as the item 112, the user 116, the tote 214, and so forth. The weight sensors 114(6) may be configured to measure the weight of the load at one or more of the inventory locations 212, the tote 214, on the floor of the facility 202, and so forth. For example, the shelf 104 may include a plurality of lanes 108 or platforms, with one or more weight sensors 114(6) beneath each one to provide weight sensor data 220 about an individual lane 108. The weight sensors 114(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 114(6) may operate as transducers that generate one or more signals based on an applied force, such as that of the load due to gravity. For example, the weight sensor 114(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 114(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 216 may use the data acquired by the weight sensors 114(6) to identify an object, determine a change in the quantity of objects, determine a location of an object, maintain shipping records, and so forth.

The sensors 114 may include one or more optical sensors 114(7). The optical sensors 114(7) may be configured to provide data indicative of one or more of color or intensity of light impinging thereupon. For example, the optical sensor 114(7) may comprise a photodiode and associated circuitry configured to generate a signal or data indicative of an incident flux of photons. As described below, the optical sensor array 114(13) may comprise a plurality of the optical sensors 114(7). For example, the optical sensor 114(7) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 114(7) may be used. The optical sensors 114(7) may be sensitive to one or more of infrared light, visible light, or ultraviolet light. For example, the optical sensors 114(7) may be sensitive to infrared light, and infrared light sources such as LEDs may provide illumination.

The optical sensors 114(7) may include photodiodes, photoresistors, photovoltaic cells, quantum dot photoconductors, bolometers, pyroelectric infrared detectors, and so forth. For example, the optical sensor 114(7) may use germanium photodiodes to detect infrared light.

One or more radio frequency identification (RFID) readers 114(8), near field communication (NFC) systems, and so forth, may be included as sensors 114. For example, the RFID readers 114(8) may be configured to read the RF tags 306. Information acquired by the RFID reader 114(8) may be used by the inventory management system 216 to identify an object associated with the RF tag 306 such as the item 112, the user 116, the tote 214, and so forth. For example, based on information from the RFID readers 114(8) detecting the RF tag 306 at different times and RFID readers 114(8) having different locations in the facility 202, a velocity of the RF tag 306 may be determined.

One or more RF receivers 114(9) may also be included as sensors 114. In some implementations, the RF receivers 114(9) may be part of transceiver assemblies. The RF receivers 114(9) may be configured to acquire RF signals 308 associated with Wi-Fi, Bluetooth, ZigBee, 3G, 4G, LTE, or other wireless data transmission technologies. The RF receivers 114(9) may provide information associated with data transmitted via radio frequencies, signal strength of RF signals 308, and so forth. For example, information from the RF receivers 114(9) may be used by the inventory management system 216 to determine a location of an RF source, such as a communication interface onboard the tote 214.

The sensors 114 may include one or more accelerometers 114(10), which may be worn or carried by the user 116, mounted to the tote 214, and so forth. The accelerometers 114(10) may provide information such as the direction and magnitude of an imposed acceleration. Data such as rate of acceleration, determination of changes in direction, speed, and so forth, may be determined using the accelerometers 114(10).

A gyroscope 114(11) may provide information indicative of rotation of an object affixed thereto. For example, the tote 214 or other objects may be equipped with a gyroscope 114(11) to provide data indicative of a change in orientation of the object.

A magnetometer 114(12) may be used to determine an orientation by measuring ambient magnetic fields, such as the terrestrial magnetic field. The magnetometer 114(12) may be worn or carried by the user 116, mounted to the tote 214, and so forth. For example, the magnetometer 114(12) mounted to the tote 214 may act as a compass and provide information indicative of which direction the tote 214 is oriented.

An optical sensor array 114(13) may comprise one or optical sensors 114(7). The optical sensors 114(7) may be arranged in a regular, repeating, or periodic two-dimensional arrangement such as a grid. The optical sensor array 114(13) may generate image data. For example, the optical sensor array 114(13) may be arranged within or below an inventory location 212 and obtain information about shadows of items 112, hand of the user 116, and so forth.

The sensors 114 may include proximity sensors 114(14) used to determine presence of an object, such as the user 116, the tote 214, and so forth. The proximity sensors 114(14) may use optical, electrical, ultrasonic, electromagnetic, or other techniques to determine a presence of an object. In some implementations, the proximity sensors 114(14) may use an optical emitter and an optical detector to determine proximity. For example, an optical emitter may emit light, a portion of which may then be reflected by the object back to the optical detector to provide an indication that the object is proximate to the proximity sensor 114(14). In other implementations, the proximity sensors 114(14) may comprise a capacitive proximity sensor 114(14) configured to provide an electrical field and determine a change in electrical capacitance due to presence or absence of an object within the electrical field.

The proximity sensors 114(14) may be configured to provide sensor data indicative of one or more of a presence or absence of an object, a distance to the object, or characteristics of the object. An optical proximity sensor 114(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 114(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 214, and so forth.

In some implementations, a proximity sensor 114(14) may be installed at the inventory location 212. The non-weight sensor data 222 generated by the proximity sensor 114(14) may be used in conjunction with the weight sensor data 220 as described in this disclosure. For example, the optical proximity sensor 114(14) may determine that the user 116 is within a threshold distance of an inventory location 212. Based on this non-weight sensor data 222, the inventory management system 216 may generate activity data indicative of that presence. By using the activity data, the inventory management system 216 may determine that the weight sensor data 220 is reliable and subsequently use changes in the weight sensor data 220 to change the item data 226 indicative of a quantity on hand.

The sensors 114 may include other sensors 114(S) as well. For example, the other sensors 114(S) may include light curtains, ultrasonic rangefinders, thermometers, barometric sensors, hygrometers, and so forth. For example, the inventory management system 216 may use information acquired from thermometers and hygrometers in the facility 202 to direct the user 116 to check on delicate items 112 stored in a particular inventory location 212, which is overheating, too dry, too damp, and so forth.

In one implementation, the light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 212, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 116 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 116 and the sheet of infrared light. In some implementations, a pair of light curtains may be arranged at right angles relative to one another to provide two-dimensional touchpoint data indicative of a position of touch in a plane.

The other sensors 114(S) may also include an instrumented auto-facing unit (AFU). The instrumented AFU may comprise a position sensor configured to provide data indicative of displacement of a pusher. As an item 112 is removed from the auto-facing unit, the pusher moves, such as under the influence of a spring, and pushes the remaining items 112 in the auto-facing unit to the front of the inventory location 212. By using data from the position sensor, and given item data 226 such as a depth of an individual item 112, a count may be determined, based on a change in position data. For example, if each item 112 is 1 inch deep, and the position data indicates a change of 3 inches, the quantity held by the AFU may have changed by 3 items 112.

In some implementations, the camera 114(1) or other sensors 114 may include hardware processors, memory, and other elements configured to perform various functions. For example, the cameras 114(1) may be configured to generate image data, send the image data to another device such as the server 304, and so forth.

The facility 202 may include one or more access points 310 configured to establish one or more wireless networks. The access points 310 may use Wi-Fi, NFC, Bluetooth, or other technologies to establish wireless communications between a device and the network 302. The wireless networks allow the devices to communicate with one or more of the sensors 114, the inventory management system 216, the optical sensor arrays 114(13), the tag 306, a communication device of the tote 214, or other devices.

Audio output devices 312 may also be provided in the facility 202. The audio output devices 312 are configured to generate signals, which may be perceived by the user 116 or detected by the sensors 114. In some implementations, the audio output devices 312 may be used to provide illumination of the optical sensor array 114(13).

Haptic output devices 312(1) are configured to provide a signal that results in a tactile sensation to the user 116. The haptic output devices 312(1) may use one or more mechanisms such as electrical stimulation or mechanical displacement to provide the signal. For example, the haptic output devices 312(1) may be configured to generate a modulated electrical signal, which produces an apparent tactile sensation in one or more fingers of the user 116. In another example, the haptic output devices 312(1) may comprise piezoelectric or rotary motor devices configured to provide a vibration, which may be felt by the user 116.

One or more audio output devices 312(2) may be configured to provide acoustic output. The acoustic output includes one or more of infrasonic sound, audible sound, or ultrasonic sound. The audio output devices 312(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 312(3) may be configured to provide output, which may be seen by the user 116 or detected by a light-sensitive sensor such as a camera 114(1) or an optical sensor 114(7). In some implementations, the display devices 312(3) may be configured to produce output in one or more of infrared, visible, or ultraviolet light. The output may be monochrome or color.

The display devices 312(3) may be emissive, reflective, or both. An emissive display device 312(3), such as using LEDs, is configured to emit light during operation. In comparison, a reflective display device 312(3), such as using an electrophoretic element, relies on ambient light to present an image. Backlights or front lights may be used to illuminate non-emissive display devices 312(3) to provide visibility of the output in conditions where the ambient light levels are low.

The display devices 312(3) may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 312(3) may use a light source and an array of MEMS-controlled mirrors to selectively direct light from the light source to produce an image. These display mechanisms may be configured to emit light, modulate incident light emitted from another source, or both. The display devices 312(3) may operate as panels, projectors, and so forth.

The display devices 312(3) may be configured to present images. For example, the display device 312(3) may comprise an addressable display 312(3)(1). The addressable display 312(3)(1) may comprise elements that may be independently addressable to produce output, such as pixels. For example, the addressable display 312(3)(1) may produce an image using a two-dimensional array of pixels.

In some implementations, the display devices 312(3) may be configured to provide non-image data, such as text characters, colors, and so forth. For example, an addressable display 312(3)(1) may comprise a segmented electrophoretic display device 312(3), segmented LED, and so forth, and may be used to present information such as a stock keeping unit (SKU) number, quantity on hand, and so forth. The display devices 312(3) may also be configurable to vary the color of the segment, such as using multicolor/multi-wavelength LED segments.

The display devices 312(3) may include image projectors 312(3)(2). For example, the image projector 312(3)(2) may be configured to project an image onto objects, illuminate at least a portion of an optical sensor array 114(13), and so forth. The image may be generated using MEMS, LCOS, and so forth.

The display devices 312(3) may include a light array 312(3)(3). The light array 312(3)(3) may comprise a plurality of discrete emissive elements configurable to emit light. The discrete emissive elements (or assemblies thereof) may be separated from one another by a distance such that, when image data of the light array 312(3)(3) is acquired, one emissive element may be distinguished from another. For example, the light array 312(3)(3) may comprise a plurality of infrared LEDs separated by at least 0.5 centimeters.

Other display devices 312(3)(D) may also be used in the facility 202. The display devices 312(3) may be located at various points within the facility 202. For example, the addressable displays 312(3)(1) or the light arrays 312(3)(3) may be located on inventory locations 212, totes 214, in or on the floor of the facility 202, and so forth.

Other output devices 312(P) may also be present. For example, the other output devices 312(P) may include scent/odor dispensers, document printers, 3D printers or fabrication equipment, and so forth.

Figure 4:
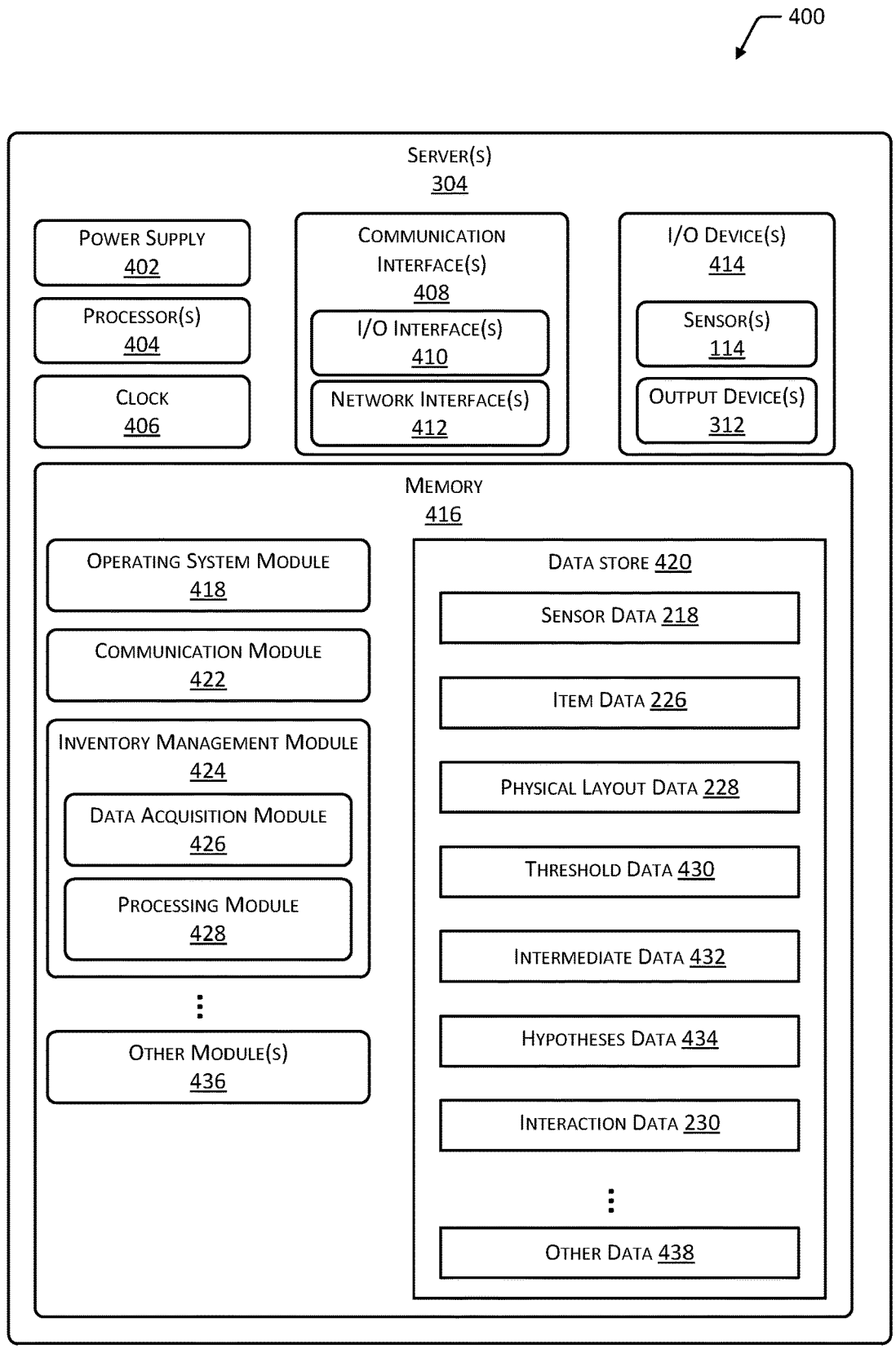
FIG. 4 is a block diagram of a server to support operation of the facility, according to some implementations.

FIG. 4 illustrates a block diagram 400 of a server 304 configured to support operation of the facility 202, according to some implementations. The server 304 may be physically present at the facility 202, may be accessible by the network 302, or a combination of both. The server 304 does not require end-user knowledge of the physical location and configuration of the system that delivers the services. Common expressions associated with the server 304 may include "on-demand computing", "software as a service (SaaS)", "platform computing", "network-accessible platform", "cloud services", "data centers", and so forth. Services provided by the server 304 may be distributed across one or more physical or virtual devices.

One or more power supplies 402 may be configured to provide electrical power suitable for operating the components in the server 304. The one or more power supplies 402 may comprise batteries, capacitors, fuel cells, photovoltaic cells, wireless power receivers, conductive couplings suitable for attachment to an external power source such as provided by an electric utility, and so forth. The server 304 may include one or more hardware processors 404 (processors) configured to execute one or more stored instructions. The processors 404 may comprise one or more cores. One or more clocks 406 may provide information indicative of date, time, ticks, and so forth. For example, the processor 404 may use data from the clock 406 to associate a particular interaction with a particular point in time.

The server 304 may include one or more communication interfaces 408 such as input/output (I/O) interfaces 410, network interfaces 412, and so forth. The communication interfaces 408 enable the server 304, or components thereof, to communicate with other devices or components. The communication interfaces 408 may include one or more I/O interfaces 410. The I/O interfaces 410 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include input devices such as one or more of a sensor 114, keyboard, mouse, scanner, and so forth. The I/O devices 414 may also include output devices 312 such as one or more of a display device 312(3), printer, audio speakers, and so forth. In some embodiments, the I/O devices 414 may be physically incorporated with the server 304 or may be externally placed.

The network interfaces 412 may be configured to provide communications between the server 304 and other devices, such as the totes 214, routers, access points 310, and so forth. The network interfaces 412 may include devices configured to couple to personal area networks (PANs), local area networks (LANs), wide area networks (WANs), and so forth. For example, the network interfaces 412 may include devices compatible with Ethernet, Wi-Fi, Bluetooth, ZigBee, and so forth.

The server 304 may also include one or more busses or other internal communications hardware or software that allow for the transfer of data between the various modules and components of the server 304.

As shown in FIG. 4, the server 304 includes one or more memories 416. The memory 416 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 416 provides storage of computer-readable instructions, data structures, program modules, and other data for the operation of the server 304. A few example functional modules are shown stored in the memory 416, although the same functionality may alternatively be implemented in hardware, firmware, or as a system on a chip (SOC).

The memory 416 may include at least one operating system (OS) module 418. The OS module 418 is configured to manage hardware resource devices such as the I/O interfaces 410, the I/O devices 414, the communication interfaces 408, and provide various services to applications or modules executing on the processors 404. The OS module 418 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 416 may be a data store 420 and one or more of the following modules. These modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including the servers 304, network attached storage devices, and so forth.

A communication module 422 may be configured to establish communications with one or more of the totes 214, sensors 114, display devices 312(3), other servers 304, or other devices. The communications may be authenticated, encrypted, and so forth.

The memory 416 may store an inventory management module 424. The inventory management module 424 is configured to provide the inventory functions as described herein with regard to the inventory management system 216. For example, the inventory management module 424 may track items 112 between different inventory locations 212, to and from the totes 214, and so forth.

The inventory management module 424 may include one or more of a data acquisition module 426 or a processing module 428. The data acquisition module 426 may be configured to acquire and access information associated with operation of the facility 202. For example, the data acquisition module 426 may be configured to acquire sensor data 218 from one or more of the sensors 114. This information may be stored in the data store 420 as part of the sensor data.

The processing module 428 may be configured to use one or more of sensor data 218, item data 226, physical layout data 228, threshold data 430, or other information to generate intermediate data 432. The intermediate data 432 may comprise information such as measured weight characteristics, cluster data indicative of clusters of lanes, gap lane data indicative of gaps between lanes on the shelf 104, and so forth. The intermediate data 432 may be dynamic in that it changes over time.

The processing module 428 may generate hypotheses data 434 or may access previously generated hypotheses data 434. The processing module 428 may then use one or more of the sensor data 218, the intermediate data 432, or the hypotheses data 434 to generate the interaction data 230.

The threshold data 430 may comprise one or more thresholds associated with operation of the processing module 428. For example, the threshold data 430 may specify a tolerance or an accepted extent of deviation permitted between a predicted value of a hypothesis and the measured sensor data 218. In another example, the threshold data 430 may include a threshold indicating a minimum count of pixels that, if different, designate a change has occurred in image data. The threshold data 430 may include other thresholds, such as an interaction threshold period, minimum weight change deemed significant, and so forth. In some implementations, the threshold data 430 may include constraint data, such as described below that may be used to constrain the hypotheses data 434.

The hypotheses data 434 may comprise the predicted values for weight characteristics for particular combinations of variables that may affect weight characteristic data. The variables may include quantities of items 112, position at the particular inventory location 212, and so forth. In some implementations, the hypotheses data 434 may be at least partially precomputed based on the item data 226 and the physical layout data 228. A hypothesis in the hypotheses data 434 may include combinations of items 112 that are adjacent to one another.

The hypotheses data 434 may comprise a data structure with information such as:

Hypothesis 1=Quantity of 3 cans of pet food SKU #12345 removed from a position on the shelf 104 that spans lanes 13 and 14, exhibits a total weight change of 910 grams, with a weight change of −455 grams on lane 13 and −455 grams lane 14.

Hypothesis 3=Quantity of 0 cans of pet food SKU #12345 removed from a position on the shelf 104 that spans lanes 13 and 14 on the shelf 104 and quantity of 3 cans of pet food SKU #67890 removed from a position on the shelf 104 that spans lanes 14 and 15, exhibits a total weight change of 905 grams, with a weight change of −320 grams on lane 14 and −585 grams on lane 15.

In some implementations, the hypotheses data 434 may be constrained. For example, the hypotheses data 434 may exclude situations such as a simultaneous pick and place in the same interaction, simultaneous removal of different types of items 112 from different positions on the shelf 104, interactions involving a minimum or maximum number of items 112, and so forth. In another example, the hypotheses data 434 may exclude hypotheses that include different types of items within a single lane. For example, two different types of lipstick designated by different item identifiers may not be supported by the same single lane on the shelf 104. These exclusions may be specified due to operator preference, based on usage patterns of the users 116, and so forth. Continuing the example, constraint data may be provided that limits the hypotheses data 434 to those hypotheses that do not have predicted quantities exceeding the stowage capacity of the inventory location 212, a particular number of lanes, and so forth. For example, the constraint data may be used to limit the hypotheses that are generated or included in the hypotheses data 434. In other implementations, the constraint data may be used to disregard particular hypotheses present in the hypotheses data 434 from further consideration. For example, a hypothesis having a predicted value or a value based on a predicated value that exceeds a threshold specified by the constraint data may be disregarded and not used to determine a solution.

By using the sensor data 218, a particular hypothesis may be selected from the hypotheses data 434 and deemed to be true or accurate given the information available. The information from the selected hypothesis may then be used to generate the interaction data 230. This interaction data 230 may be used to change item data 226 (such as quantity on hand), track objects, and so forth. For example, based on the weight sensor data 220 indicating a measured change in weight of −455 g at lane 13 and −447 g at lane 14, and a weight change of 902 g, hypotheses 1 may be determined to be correct, within the tolerance of error specified by the threshold data 430. The other hypotheses may be disregarded as the weight changes measured by the lanes differ from those presented in hypotheses beyond the tolerance of error. In some implementations, the hypotheses may be scored with a score indicative of deviation or variance from the predicted values of the hypothesis as compared to the measured values. In other implementations, selection of the solution from among hypotheses that describe similar weight characteristics may be disambiguated using the non-weight sensor data 222.

Continuing the example, with hypothesis 1 being deemed the solution, the interaction data 230 generated may indicate that 3 cans of pet food having SKU #12345 were removed from the particular location on the shelf 104. The quantity on hand at that location may be decreased accordingly, and the quantity determined to be in possession of the user 116 may be increased accordingly.

Operation of the processing module 428 and the various data involved including the intermediate data 432, the hypotheses data 434, the interaction data 230, and so forth, is discussed in more detail below.

Processing of the sensor data 218, intermediate data 432, or other data may be performed by the processing module 428 or other modules implementing, at least in part, one or more of the following tools or techniques. In one implementation, processing of the non-weight sensor data 222 such as images acquired by the cameras 114(1) may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 218.

Techniques such as artificial neural networks (ANN), active appearance models (AAM), active shape models (ASM), principal component analysis (PCA), cascade classifiers, and so forth, may also be used to process the sensor data 218 or other data. For example, the ANN may be a trained using a supervised learning algorithm such that object identifiers are associated with images of particular objects within training images provided to the ANN. Once trained, the ANN may be provided with the sensor data 218 such as the non-weight sensor data 222 comprising image data from a camera 114(1), and so forth, and may provide, as output, the object identifier. Likewise, the ANN may be used to process the weight sensor data 220.

The processing module 428 may also process the non-weight sensor data 222, such as the images, using one or more machine vision counting techniques to determine a count of the items 112. For example, machine vision counting techniques may be configured to identify a top portion of the items 112 as acquired from a camera 114(1) that is looking down on the shelf 104 holding the items 112. This determination may be based on item data 226, such as previously acquired images of a sampled item 112. Each of the tops of the type of item 112 appearing in a frame may be identified, and a count made. A change in count may be determined based on image data obtained at a first time and image data obtained at a second time.

Other modules 436 may also be present in the memory 416 as well as other data 438 in the data store 420. For example, the other modules 436 may include an accounting module while the other data 438 may include billing data. The accounting module may be configured to assess charges to accounts associated with particular users 116 or other entities, while the billing data may include information such as payment account numbers.

Figure 5:
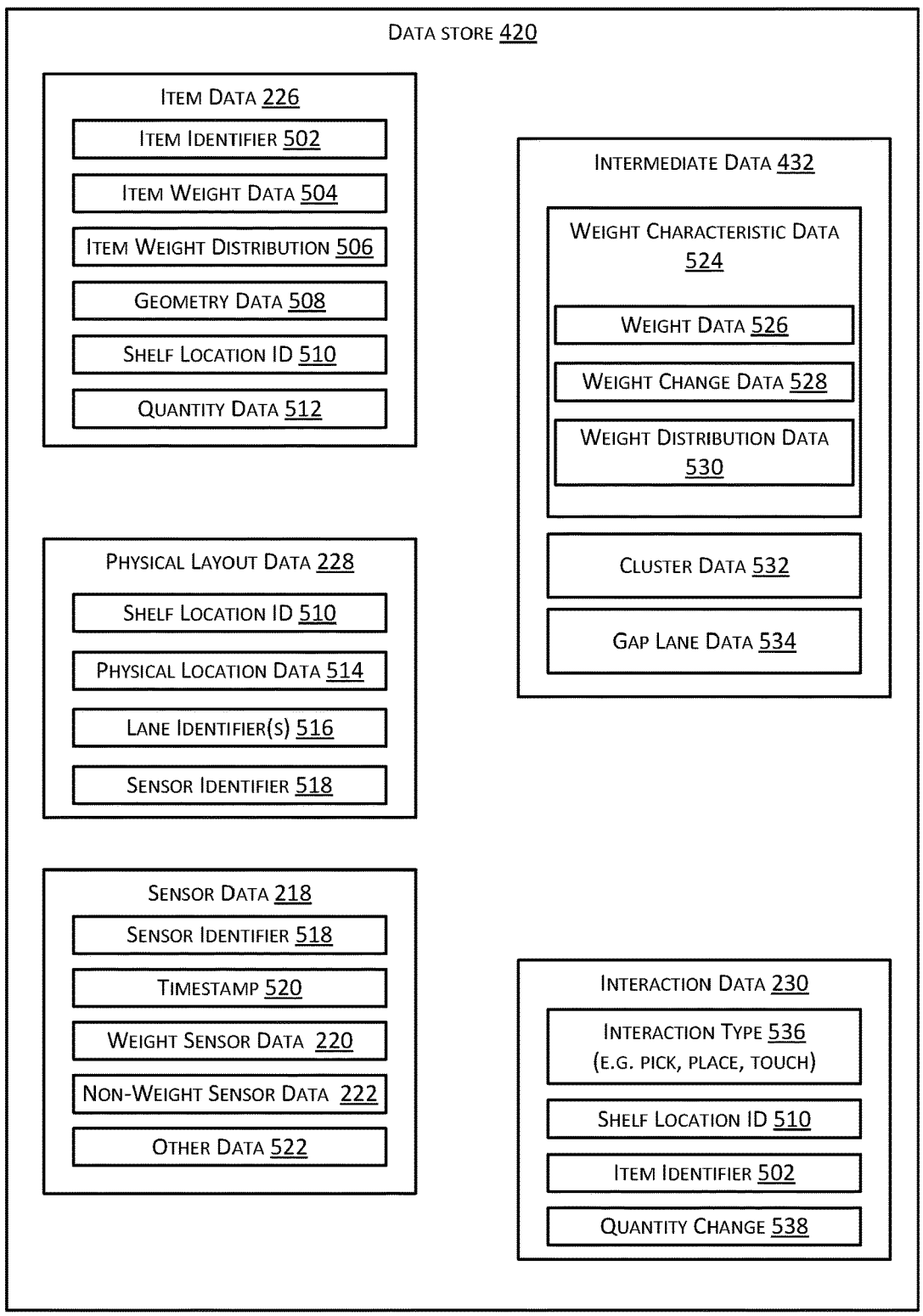
FIG. 5 is a block diagram of additional data that may be used by the server to support operation of the facility, according to some implementations.

FIG. 5 is a block diagram 500 of additional data that may be used by the server 304 to support operation of the facility 202, according to some implementations. This data may be stored at least in part by the data store 420. As described above with regard to FIG. 4, the inventory management module 424 may use the sensor data 218 to generate other information such as interaction data 230 indicative of what item 112 a user 116 has interacted with.

The processing module 428 may access the item data 226. The item data 226 may include an item identifier 502. The item identifier 502 may be used to distinguish one item 112 from another. For example, the item identifier 502 may include a SKU, Universal Product Code (UPC) number, and so forth. The items 112 that are of the same type may be referred to by the same item identifier 502. For example, 550 grams cans of beef flavor Brand X dog food may be represented by the item identifier 502 value of "9811901181". In other implementations, non-fungible items 112 may each be provided with a unique item identifier 502 allowing each to be distinguished from one another.

The item data 226 may include one or more of item weight data 504, item weight distribution 506, and so forth. The item weight data 504 comprises information indicative of a weight of a single item 112, or a package, kit, or other grouping considered to be a single item 112. The item weight distribution 506 may indicate a relative position of a center-of-mass (COM) of the item 112. For example, the item weight distribution 506 data may indicate the item 112 is heavier on the left than on the right.

The item data 226 may also include geometry data 508 such as size and shape of the item 112. For example, the geometry data 508 may include the overall shape of an item 112, such as a cuboid, sphere, cylinder, and so forth. The geometry data 508 may also include information such as length, width, depth, and so forth, of the item 112. Dimensional information in the geometry data 508 may be measured in pixels, centimeters, inches, arbitrary units such as number of lanes, and so forth. The geometry data 508 may be for a single item 112, or a package, kit, or other grouping considered to be a single item 112.

The item data 226 may include one or more shelf location identifiers (IDs) 510. The shelf location ID 510 is indicative of a particular area or volume of an inventory location 212 that is designated for stowage of the item 112. For example, a single shelf 104 may be designated as several shelf locations, each with a different shelf location ID 510. Each of the different shelf location IDs 510 may be associated with a particular area on the shelf 104 designated for storage of a particular type of item 112. A single type of item 112 may be associated with a particular shelf location ID 510, or in other implementations, more than one type of item 112 may be associated with the particular shelf location ID 510.

The item data 226 may also include quantity data 512. The quantity data 512 may comprise a count or value indicative of a number of items 112. The count may be a measured or estimated value. The quantity data 512 may be associated with a particular shelf location ID 510. For example, the same type of item 112 may be stored at different shelves 104 within the facility. In other implementations, the item data 226 may include other data, such as an image of the item 112, point cloud data for the item 112, and so forth.

The physical layout data 228 may provide information about how the facility 202 is physically configured, location of sensors 114 and fixtures in the facility 202, and so forth. For example, physical layout data 228 may comprise information representative of a map or floor plan of the facility 202 with relative positions of inventory locations 212, planogram data indicative of how items 112 are to be arranged at the inventory locations 212, and so forth.

The physical layout data 228 may associate a particular shelf location ID 510 with other information such as physical location data 514, lane identifiers 516, sensor identifiers 518, and so forth. The physical location data 514 provides information about where in the facility 202 the inventory location 212 is. For example, the physical location data 514 may specify a particular shelf 104 is located on a particular rack within a particular aisle 210.

The lane identifier 516 is indicative of one or more lanes that are associated with the shelf location ID 510. For example, the inventory location 212 where a particular type of item 112 is stowed may span lanes 5, 6, and 7. The physical layout data 228 may be used to determine the particular lane identifiers 516 associated with a particular location where a certain type of item 112 is stowed.

The physical layout data 228 may include sensor identifier 518 data. The sensor identifier 518 may be used to associate a particular sensor 114 with a particular location within the facility 202 or fixtures such as an inventory location 212. For example, the physical layout data 228 may associate a weight sensor 114(6) serial number 05182000 with lane identifier 516(16) of shelf 104(47) on aisle 210(3).

The sensor data 218 may also be stored in the data store 420. The sensor data 218 may include a sensor identifier 518 comprising data indicative of a particular sensor 114, such as a certain camera 114(1), weight sensor 114(6), and so forth. The sensor identifier 518 may be unique in the context of a particular inventory location 212, aisle 210, facility 202, or globally across multiple facilities 202.

The sensor data 218 may be generated or acquired by one or more of the sensors 114. The sensor data 218 may include one or more of the sensor identifiers 518, a timestamp 520, weight sensor data 220, non-weight sensor data 222, or other data 522. The timestamp 520 may comprise information indicative of a time when the sensor data 218 was acquired. For example, the timestamp 520 may be based at least in part on time data obtained from a clock onboard the sensor 114, by the clock 406 on the server 304, and so forth. The inventory management module 424 may use the timestamp 520 to determine the interaction data 230. For example, the weight sensor data 220 from different weight sensors 114(6) may be processed to determine weight sensor data 220 that occurred contemporaneously, which may then be processed to determine the weight characteristic data 524 associated with an interaction.

As described above, the sensor data 218 may be broadly categorized as comprising weight sensor data 220 and non-weight sensor data 222. For example, the weight sensor data 220 may comprise information obtained from one or more the weight sensors 114(6). Conversely, the non-weight sensor data 222 may comprise information obtained from the sensors 114 other than the weight sensors 114(6).

In some implementations, the non-weight sensor data 222 may comprise image data. The image data may be obtained from one or more sensors 114, such as a camera 114(1), a 3D sensor 114(2), or an optical sensor array 114(13). The image data may comprise one or more pixels.

The sensor data 218 may include other data 522. For example, other data 522 may comprise information indicative of operational status of the sensor 114, error messages associated with the sensor 114, and so forth.

As described above, the intermediate data 432 may be generated by the processing module 428 or by other modules. The intermediate data 432 may include weight characteristic data 524. The weight characteristic data 524 may be predicted or measured. Predicted weight characteristic data 524 may be based on hypotheses data 434. In comparison, measured weight characteristic data 524 may be generated based on the weight sensor data 220. The inventory management module 424 may determine the weight characteristic data 524. Alternatively, the determination of the weight characteristic data 524 may be performed at least partially on board the weight sensor 114(6) or an associated device such as a controller.

The weight characteristic data 524 may include one or more of weight data 526, weight change data 528, weight distribution data 530, and so forth. The weight data 526 is indicative of the weight of the load given a particular set of conditions or at a particular time. For example, predicted weight data 526 may be based on the conditions specified by the hypotheses data 434, such as a predicted quantity and item weight data 504. In another example, measured weight data 526 may indicate the weight at a particular lane at a particular time.

The weight change data 528 indicates a change in weight from a first condition to a second condition, or from a first time to a second time. For example, the first condition and the second condition may be specified in hypotheses data 434, such as a predicted addition or removal of a particular type of item 112. In another example, the weight change data 528 may be a net change in weight from the first time to the second time. The weight change data 528 may be determined on a per-lane basis, providing measured or predicted lane weight change data 528.

The weight distribution data 530 provides information indicative of a distribution in weight as measured across two or more weight sensors 114(6). The weight distribution data 530 may be expressed as a measured weight at a particular weight sensor 114(6), a ratio or percentage of weight on a weight sensor 114(6), and so forth. For example, the weight distribution data 530 may be expressed as "3213 g left, 3214 g right", as a dimensionless ratio such as "0.59 left, 0.41 right", and so forth. The weight distribution data 530 may be predicted or measured. The weight distribution data 530 may provide data indicative of weight distribution as predicted or measured by one or more of the weight sensors 114(6). For example, the weight distribution data 530 for a configuration in which a rectangular shelf 104 has a weight sensor 114(6) at each of the four corners may have weight distribution data 530 corresponding to each of the corners. In another implementation, the weight distribution data 530 may indicate weight distribution across two or more adjacent lanes.

The weight distribution data 530 may provide data indicative of COM at a particular time or condition such as predicted by a hypothesis. For example, the weight distribution data 530 may indicate a COM, change in the COM from a first time to a second time, and so forth. A variety of techniques may be used to calculate the COM or center-of-gravity. The COM may be described as the point in space at which weighted position vectors relative to this point sum to zero. For example, the COM of a sphere is a point in the center of the sphere. In another example, the COM of a toroid is a point in the center of the toroid.

The intermediate data 432 may include other information such as cluster data 532, gap lane data 534, and so forth. The cluster data 532 comprises information indicative of a cluster of lanes. The cluster of lanes may include one or more lanes of the shelf 104 that are adjacent to one another and that experience a common change in one or more weight characteristic data 524. For example, during a particular time, if lane 1 and lane 3 both exhibit weight change data 528 that exceeds the threshold value, the lanes may be deemed to be part of the same cluster. Clusters are described in more detail below with regard to FIG. 8. The gap lane data 534 provides information about lanes that separate two or more clusters. For example, a gap lane may comprise a lane that experienced no measured or predicted weight change that exceeded a threshold value. Gap lanes are described in more detail below with regard to FIG. 8.

The processing module 428 may access one or more of the sensor data 218, the item data 226, the physical layout data 228, the intermediate data 432, or other data to determine the interaction data 230.

During operation, the weight sensor data 220 may be "tared" or zeroed out while the load on the lane measured by the weight sensors 114(6) is in a stable state. Subsequent changes in the weight sensor data 220 may be used to produce the weight characteristic data 524. For example, the weight change data 528 may be based on changes following a tare.

The processing module 428 or other modules may transform the weight characteristic data 524 from one form to another. For example, the weight data 526 from a plurality of lanes in the shelf 104 may be used to determine the weight distribution data 530.

The processing module 428 may generate interaction data 230 using one or more of the sensor data 218, the item data 226, the physical layout data 228, the intermediate data 432, and so forth. The interaction data 230 may comprise one or more of an interaction type 536, a shelf location ID 510, an item identifier 502, a quantity change 538, and so forth.

The interaction type 536 may provide information about whether the interaction is determined to be a pick, place, touch, pick and place, and so forth. The processing module 428 may use the intermediate data 432 or other information such as the sensor data 218 to determine the interaction type 536.

As described above, shelf location ID 510 provides information about where the interaction took place. For example, the shelf location ID 510 may indicate a particular area on a particular shelf 104 on a particular rack in a particular aisle 210.

The item identifier 502 specifies the item 112 implicated by the interaction. For example, the item identifier 502 may indicate the item 112 that was picked, placed, touched, and so forth. In some implementations, the item identifier 502 may be determined at least in part by the weight sensor data 220. For example, based on the weight characteristic data 524, the particular item 112 may be identified, the quantity change 538 of the items 112 at the inventory location 212 resulting from the interaction may be determined, and so forth.

The quantity change 538 provides information indicative of a change in the quantity of the item 112 resulting from the interaction. For example, the quantity change 538 may indicate a value of "−1" when a single item 112 is picked from the inventory location 212, or value of "+3" when three items 112 are placed into the inventory location 212.

The item data 226 may provide information about an individual item 112, while the interaction data 230 may comprise information about one or more of the items 112 that may be undergoing some change, such as movement from the inventory location 212 to the tote 214.

In one implementation, the processing module 428 may generate other information about the items 112 stowed at the inventory location 212. For example, the interaction data 230 may be analyzed to determine if a user 116 such as a person tasked with restocking the inventory location 212 is rotating stock such that old stock is brought to the front while new stock is placed behind.

Figure 6:
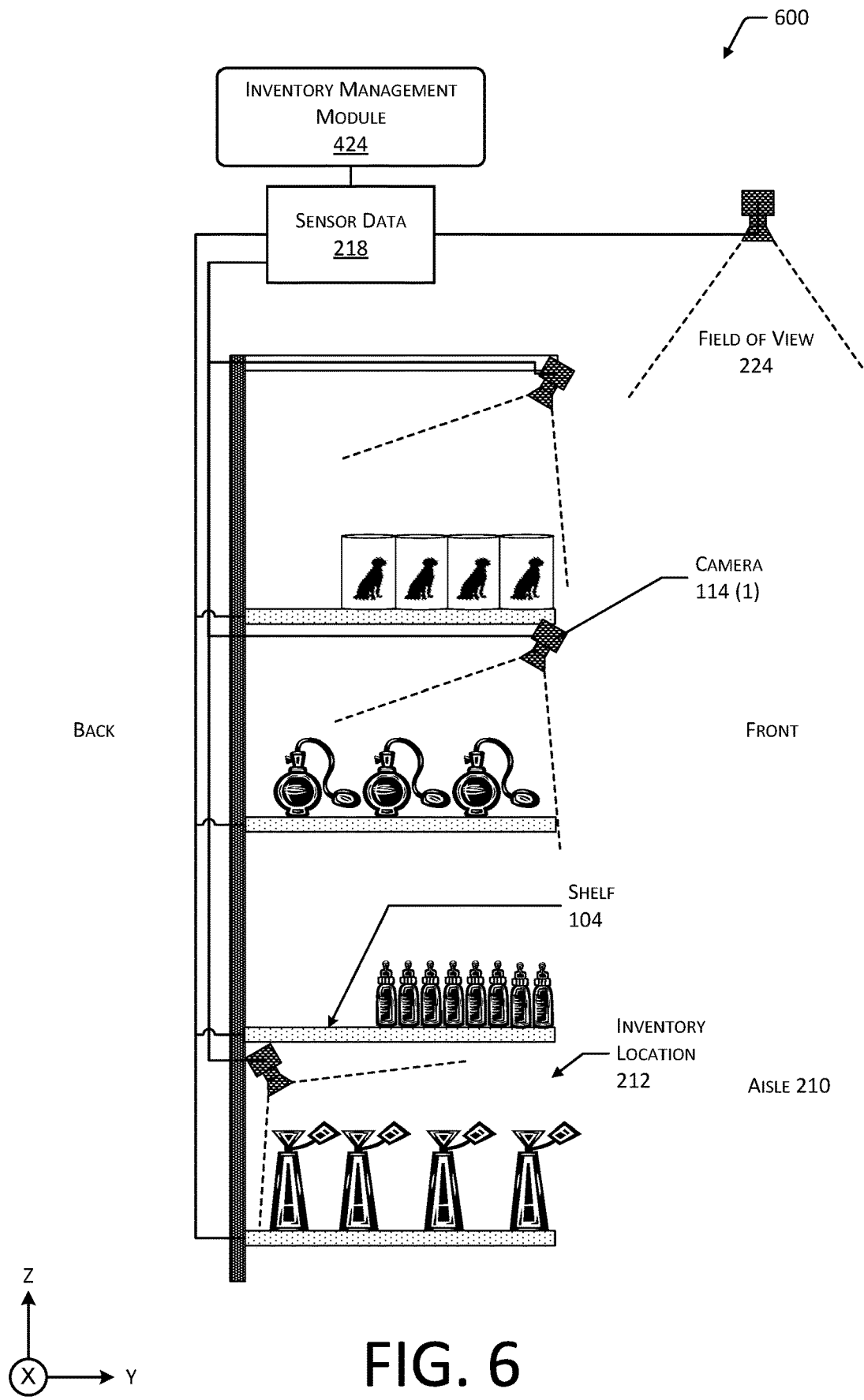
FIG. 6 illustrates a side view of an inventory location that includes various sensors, according to some implementations.

FIG. 6 illustrates a side view 600 of an inventory location 212 that includes various sensors 114, according to some implementations. In this illustration, the inventory location 212 comprises a shelf 104 mounted to a rack. In other implementations, the shelf 104 may be mounted on a surface, such as a table or counter.

One or more weight sensors 114(6) may be used to obtain weight sensor data 220 from one or more lanes at the shelf 104. The configuration of the shelf 104 is described in more detail below with regard to FIGS. 7-8.

One or more cameras 114(1) may also be positioned at one or more of on, in the, or around the inventory locations 212. For example, cameras 114(1) may be arranged such that their FOV 224 looks on a shelf 104. The cameras 114(1) may be arranged at a front edge of the inventory location 212 such as closest to the aisle 210 during operation, at the back edge of the inventory location 212, both at the front and back edges, overhead, and so forth. The cameras 114(1), weight sensors 114(6), and other sensors 114 may provide sensor data 218 to the inventory management module 424.

Figure 7:
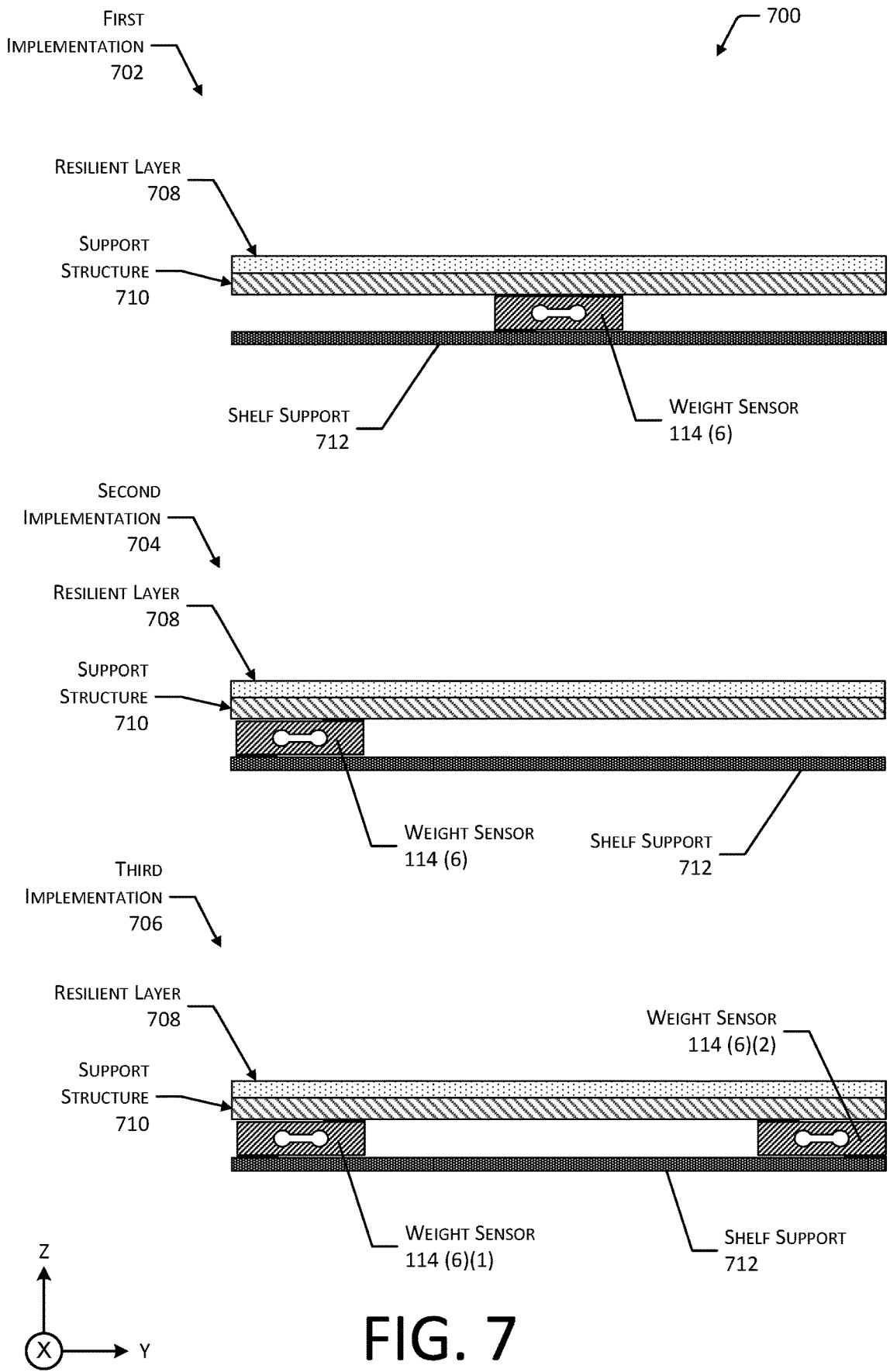
FIG. 7 illustrates a side view of the shelf, according to some implementations.

FIG. 7 illustrates side views 700 of the shelf 104 of FIG. 6, according to some implementations. A first implementation 702 depicts a single weight sensor 114(6) in the center of a lane 108. A second implementation 704 depicts a single weight sensor 114(6) at one end of a lane 108. A third implementation 704 depicts a first weight sensor 114(6)(1) at a first end of a lane 108 and a second weight sensor 114(6)(2) at a second end of the lane 108, such as depicted in FIG. 6. In the first implementation 702, the single weight sensor 114(6) may be arranged in a center of the lane 108. In another implementation, such as that depicted in the second implementation 704, the weight sensor data 220 may be obtained from a single weight sensor 114(6) located at one end of the lane 108, such as the front of the lane or the back of the lane 108. In yet another implementation. In the third implementation 706, the weight sensor data 220 obtained from a plurality of weight sensors 114(6) coupled to a single lane 108 may be used to generate weight distribution data 530.

In some situations, two or more weight sensors 114(6) may be used in conjunction with one another at the same position along the support structure 710 between the front and the back of the lane 108. For example, a pair of weight sensors 114(6)(1) and 114(6)(2) may be side-by-side on one end of the lane 108.

The shelf 104 may comprise a resilient layer 708 upon which one or more of the items 112 may rest. The resilient layer 708 may comprise one or more of the foam, gel, elastomer, or other material or structure. The resilient layer 708 may allow for some mechanical deformation upon application of a force, such as the weight of an item 112, and resumes substantially the same original shape after removal of the force. The resilient layer 708 may facilitate operation of the shelf 104 by accommodating the slight movement between adjacent lanes 108. For example, as depicted in FIG. 6, weight of the larger and heavier items 112(4) may deflect lanes 13 and 14 relative to lanes 12 and 15. The resilient layer 708 may help maintain stability of the items 112(5) that have an edge resting on part of lane 14.

Support structure 710 provides underlying rigidity and a mechanical element to support the resilient layer 708 and the items 112 loaded thereon. The resilient layer 708 may be applied to, affixed to, integral with, or otherwise associated with the support structure 710. For example, the support structure 710 may comprise a sheet of steel, a composite material, and so forth. The support structure 710 may incorporate one or more features to provide mechanical rigidity, such as ribs formed into or affixed to the sheet of steel.

The support structure 710 is in turn supported by one or more weight sensors 114(6), or structures coupled thereto. The one or more weight sensors 114(6) are in turn supported by a shelf support 712. The shelf support 712 may be coupled to another structure, such as a rack, backplane, countertop, and so forth.

Other types of weight sensors 114(6) may be used instead of, or in addition to, the load cells described. For example, a force sensitive resistor (FSR) 114(6) or other sensor 114 may be arranged atop the support structure 710. In one implementation each of the lanes 108 may have a separate FSR 114(6). In another implementation, a single FSR 114(6) may be divided into sections, with one or more sections covering a different lane 108. For example, a single FSR 114(6) covering the shelf 104 depicted in FIG. 1 may have 16 different sections, each section in a different lane 108. In another example, each lane 108 may have two or more sections of the FSR 114(6).

Figure 8:
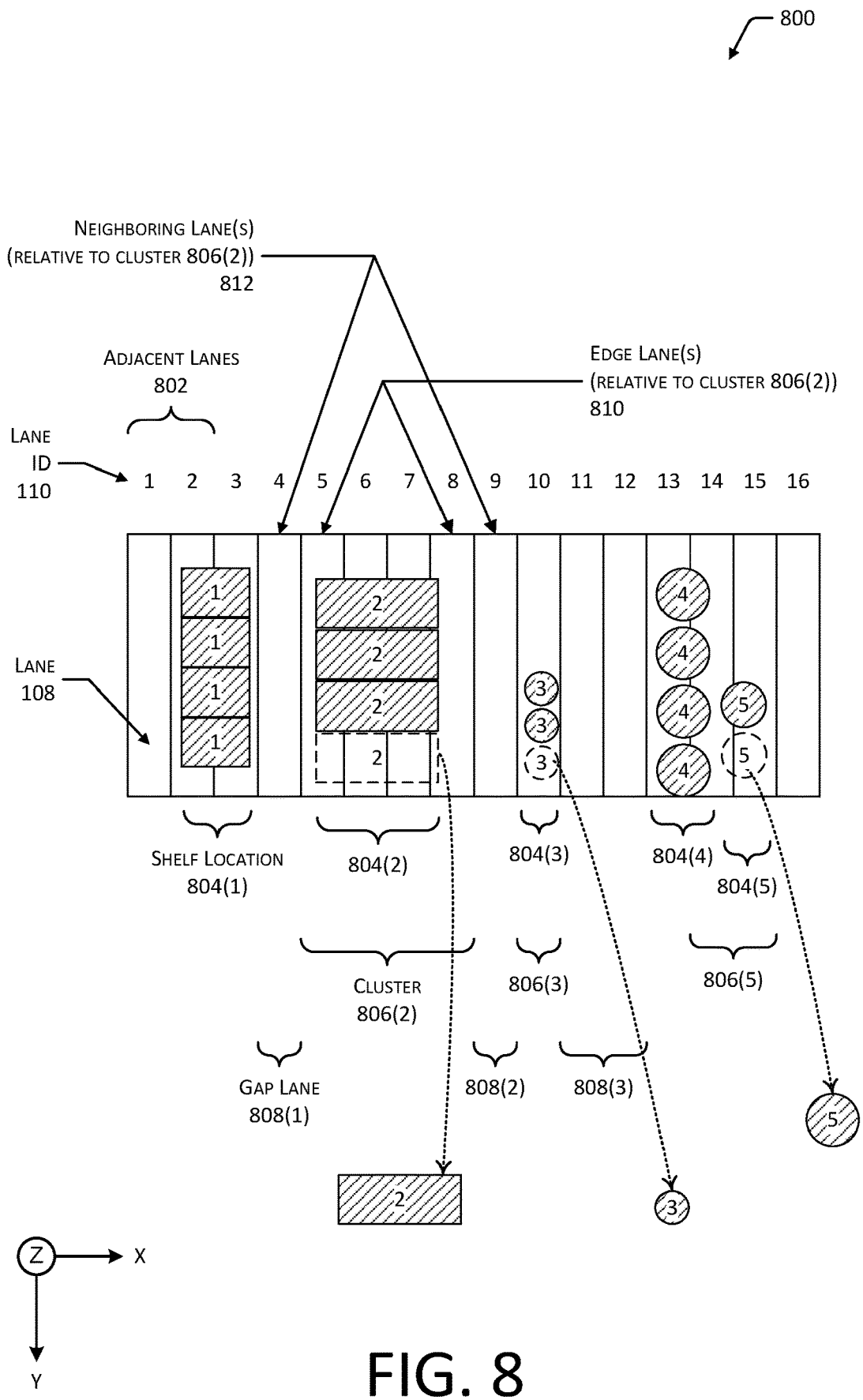
FIG. 8 illustrates an overhead schematic view of the shelf, according to some implementations.
Figure 9:
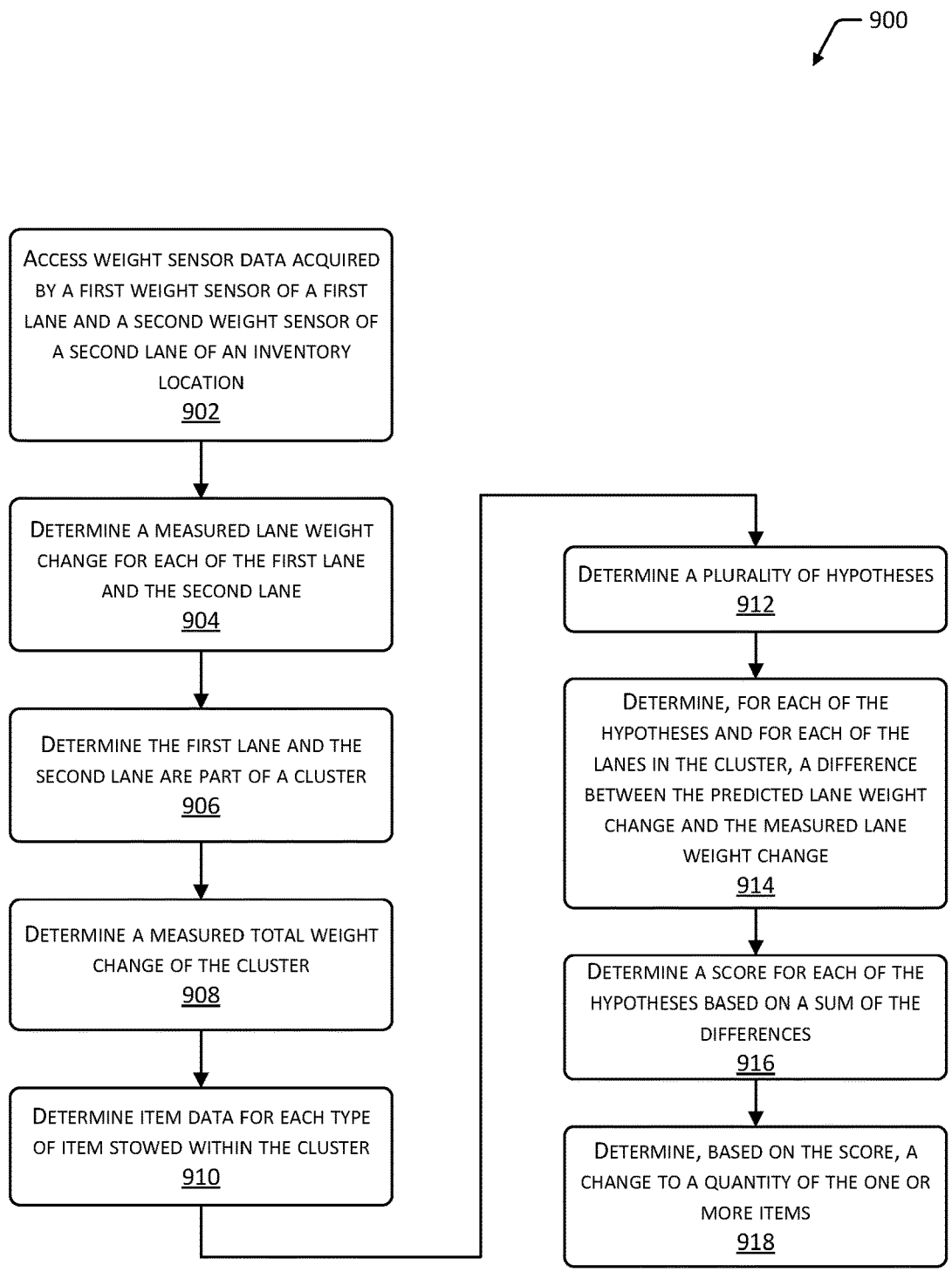
FIG. 9 depicts a flow diagram of a process for determining an interaction with a particular item based on weight sensor data, according to some implementations.
Figure 10:
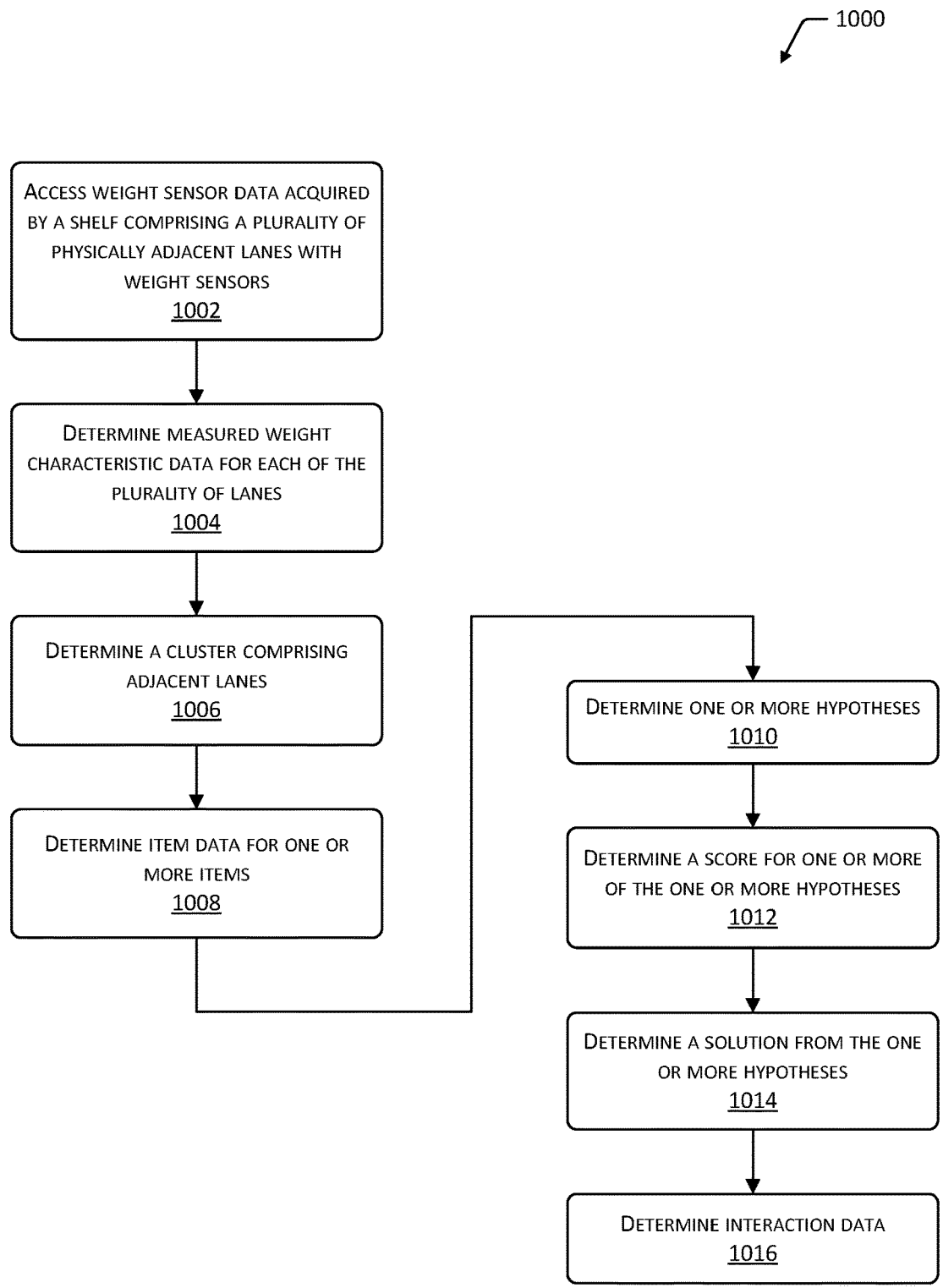
FIG. 10 depicts a flow diagram of a process for determining an interaction with a particular item based on weight sensor data, according to some implementations.

FIG. 8 illustrates an overhead schematic view 800 of the shelf 104, according to some implementations. To facilitate the discussion of FIGS. 9-10, FIG. 8 illustrates various elements.

As described above with regard to FIG. 6, the shelf 104 comprises 16 lanes 108 that are adjacent to one another. The lanes 108 number 1 through 16, left to right, with each lane 108 adjacent to at least one other lane 108. Adjacent lanes 802 are two or more lanes 108 that are proximate to one another. For example, lane 1 and lane 3 are proximate to one another. Edges of adjacent lanes 802 may, but need not, be in contact with one another. For example, a gap or space may exist between the proximate edges of adjacent lanes 802.

The shelf 104 may be subdivided into one or more shelf locations 804. Each shelf location 804 may be associated with a particular shelf location ID 510. In this illustration there are five shelf locations 804(1)-(5). Each shelf location 804 is an area designated for stowage of a particular type of item 112. For example, the shelf location 804(1) is designated for stowage of items 112(1), the shelf location 804(2) is designated for stowage of items 112(2), the shelf location 804(3) is designated for stowage of items 112(3), the shelf location 804(4) is designated for stowage of items 112(4), and the shelf location 804(5) is designated for stowage of items 112(5). The shelf locations 804 may not be defined by or separated using physical partitions. For example, in the configuration illustrated here, no partitions exist between the different types of items 112. However, in other configurations, physical partitions or walls may be used on the shelf 104 to maintain a tidy arrangement of the items 112 on the shelf 104.

During operation of the facility, items 112 may be added to or removed from the shelf locations 804 by interactions. These interactions may result in changes in the weight sensor data 220 generated by the weight sensors 114(6). One or more adjacent lanes 802 that exhibit measured weight changes that exceed a threshold may be designated as forming a cluster 806. In the interaction depicted in this illustration, a quantity of one each of items 112(2), 112(3), and 112(5) have been removed from the shelf 104 during an interaction. The corresponding lanes 108 supporting these items 112 exhibited changes in weight that exceed the threshold. Adjacent lanes 802 undergoing those changes are designated as clusters 806(2), 806(3), and 806(5), respectively. For example, lanes 5-8 form cluster 806(2), lane 10 forms a single-lane cluster 806(3), and lanes 14 and 15 form cluster 806(5). A shelf location 804 may encompass an area that is less than or equal to an area of the lanes 108 in a cluster 806. For example, a shelf location 804 may use up less than all of a lane 108.

The clusters 806 are separated from one another by one or more gap lanes 808. In one implementation, gap lanes 808 may be based on measured weight characteristic data 524. For example, those lanes 108 that have measured weight change data 528 that is less than the threshold may be designated as gap lanes 808. In another implementation, the gap lanes 808 may be determined based on item data 226 and physical layout data 228. For example, the gap lane 808 may be designated as an entire lane 108 that separates two lanes 108 that are designated as occupied at least in part by an item 112 based on the physical layout data 228.

Each shelf location 804 has one or more edge lanes 810. The edge lanes 810 comprise those outermost lanes 108 associated with the shelf location 804, such as the extreme leftmost and extreme rightmost lanes 108 that are occupied by at least a portion of an item 112. For lanes 108 located at either end of the shelf 104, such as lane 1 or lane 16 in this illustration, a shelf location 804 may have only a single edge lane 810 that is toward the middle of the shelf 104, such as lane 3 and lane 15, respectively. In other implementations, the edge lanes 810 may be relative to the cluster 806. The edge lanes 810 may be determined for the shelf locations 804 associated with the items 112 present in particular hypotheses of the hypotheses data 434.

Adjacent to each edge lane 810 may be a neighboring lane 812. In some implementations neighboring lanes 812 may also be gap lanes 808. The neighboring lane 812 may be designated as the lane 108 adjacent to the edge lane 810 but which is not associated with a particular item 112 or hypothesis. For example, relative to the group of items 112(2) at the shelf location 804(2), lanes 5-8 are the cluster 806(2), lanes 5 and 8 are the edge lanes 810, and the neighboring lanes 812 are 5 and 9.

A hypothesis in the hypotheses data 434 may include combinations of items 112 that are adjacent to one another. For example, a hypothesis in the hypotheses data 434 may include predicted changes to quantities for each of the five different types of items 112 depicted on the shelf 104 at FIG. 8, including those items 112 that did not show a change in weight characteristic data 524, such as items 112(1) and 112(4). However, various hypotheses may include different or particular combinations of changes in the predicted quantity of items 112(4) and 112(5) because they both are supported at least in part by lane 14. In some implementations, the cluster 806 may be extended to include a lane 108 that exhibited no change but for which an item 112 spans onto. For example, the cluster 806(5) may include lanes 13-15, even though lane 13 reported no change in measured weight characteristic data 524. Lane 13 may be included in the cluster 806(6) because lane 13 provides support to an item 112(4) that is also supported by lane 14 which did experience a change in measured weight characteristic data 524. The predicted quantity change in hypotheses data 434 for these items 112 for which no change in measured weight characteristic data 524 was detected for the corresponding lanes may be zero. For example, the hypotheses data 434 may indicate a predicted quantity change of 0 for the item 112(4) as no measured weight change data 528 was observed in lane 13.

By processing the sensor data 218 as described in FIGS. 9 and 10, and assessing with respect to predicted values in one or more hypotheses of the hypotheses data 434, the inventory management module 424 may be able to generate interaction data 230. The interaction data 230 may then be used to update other information, such as the quantity data 512.

Illustrative Processes

FIG. 9 depicts a flow diagram 900 of a process for determining interaction data 230 based on weight sensor data 220, according to some implementations. The process may be implemented at least in part by the inventory management module 424. In different implementations, one or more of the blocks described below may be omitted, the sequence of the process using these blocks may vary from that depicted, and so forth.

Block 902 accesses weight sensor data 220 acquired by a first weight sensor 114(6) of a first lane 108(1) and a second weight sensor 114(6) of a second lane 108(2). For example, the shelf 104 may have two lanes 108(1) and 108(2).

Block 904 determines weight characteristic data 524 for each of the lanes 108. For example, measured lane weight change data 528 for the first lane 108(1) and the second lane 108(2) that is indicative of a change in weight from a first time to a second time may be determined. The measured change in weight may be determined by subtracting the measured weight data 526 obtained at the first time from the second time, or vice versa.

Block 906 determines a cluster 806 based on the measured weight change for each of the first lane 108(1) and the second lane 108(2). For example, the cluster 806 may comprise any one or more adjacent lanes 108 that exhibit a measured lane weight change that exceeds a threshold. The determined cluster 806 may be stored as cluster data 532. In some implementations, gap lane data 534 may also be determined.

Block 908 determines, using the weight sensor data 220, a measured total weight change of the cluster 806. For example, the measured lane weight change data 528 for the first lane 108(1) and the second lane 108(2) may be summed to determine the measured total weight change of the cluster 806.

Block 910 determines item data 226 for each type of item 112 stowed at the cluster 806. As described above, the item data 226 may include one or more of an individual weight for each type of item 112 or a shelf location 804 of each type of item 112. As described above, the shelf location 804 is indicative of placement of the type of item 112 with respect to one or more of the first lane 108(1) or the second lane 108(2). For example, the shelf location 804 may indicate an area that is equally distributed across both lanes 108(1) and 108(2).

Block 912 determines a plurality of hypotheses. For example, previously computed hypotheses data 434 may be accessed, hypotheses data 434 may be generated on demand, or a combination of the two. Each hypothesis may be indicative of different combinations of one or more of a predicted quantity change for the one or more types of items 112 located at the cluster 806, predicted lane weight change data 528 for each of the lanes 108 at the cluster 806, and predicted total weight change data 528 of all lanes 108 in the cluster 806. The predicted lane weight change data 528, the predicted total weight change data 528, and so forth, may be based on parameters specified by a particular hypothesis. For example, the hypothesis may specify a predicted quantity change of one or more particular types of items 112. Based on information such as the item data 226 indicating the individual weight for each of the types of items 112 located at the cluster 806 and the physical layout data 228 providing information about shelf location 804 of each of the types of item 112, the predicted lane weight change data 528 and the predicted total weight change data 528 may be calculated. For example, if the shelf location 804 indicates that the items 112 are arranged 80% on the first lane 108(1) and 20% on the second lane 108(2), the predicted weight on each of the lanes 806 may be determined.

In some implementations, the plurality of hypotheses may be constrained to remove or disregard from consideration those hypotheses that are considered too different from the measured values. For example, for each of the hypotheses, a difference between the predicted total weight change and the measured total weight change may be determined. Those hypotheses having differences that exceed a threshold may be disregarded from further consideration. For example, the threshold may specify a difference between the predicted total weight change and the measured total weight change of less than 50 grams. Those hypotheses having a predicted total weight change greater than 50 grams may be disregarded from further consideration during the remainder of the process.

The plurality of hypotheses to be considered as potential solutions may be constrained in other ways as well. In one implementation, the hypotheses data 434 may be constrained such that predicted quantity changes for one or more types of items 112 located at the cluster 806 are less than or equal to a maximum storage capacity of the items 112 for the cluster 806. For example, the shelf location 804 that is at the cluster 806 may be designated as holding a maximum of 30 of the items 112. The maximum quantity may be specified as a default or calculated based on information such as the area available and the geometry data 508 of the item 112.

Block 914 determines, for each of the hypotheses in the hypotheses data 434 and for each of the lanes 108 in the cluster 806, a difference between the predicted lane weight change data 528 and the measured lane weight change data 528. For example, the predicted lane weight change data 528 may be subtracted from the measured lane weight change data 528.

Block 916 determines a score for each of the hypotheses based on a sum of the differences associated with that hypothesis. For example, the differences for each of the lanes 108 in the cluster 806 may be summed together to determine the score for that hypothesis. In some implementations, other operations may be performed to produce the score. For example, a reciprocal of the summed value may be used to generate the score, such that a greater score is indicative of less deviation between the predicted and measured values.

Block 918 determine, based on the score for each hypothesis in the plurality of hypotheses, a change to quantity of the one or more items 112. Continuing the previous example, the hypothesis from the hypotheses data 434 that has the greatest score may be selected at the solution. The predicted values for the solution may then be designated indicative of the interaction. For example, the solution may comprise a hypothesis that indicates that 3 cans of pet food SKU #12345 were removed from a particular shelf location 804. The quantity data 512 in the item data 226 associated with that shelf location ID 510 may then be changed to decrease the quantity on hand at that shelf location 804 by 3.

FIG. 10 depicts a flow diagram 1000 of a process for determining an interaction with a particular item 112 based on weight sensor data, according to some implementations. The process may be implemented at least in part by the inventory management module 424. In different implementations, one or more of the blocks described below may be omitted, the sequence of the process using these blocks may vary from that depicted, and so forth.

Block 1002 accesses weight sensor data 220 acquired by a shelf 104 comprising a plurality of physically adjacent lanes 802 with weight sensors 114(6). As described above, each lane 108 may have one or more weight sensors 114(6).

A block may process the weight sensor data 220 to decrease noise in the weight sensor data 220. For example, "raw" or otherwise unprocessed or minimally processed weight sensor data 220 for a lane 108 may be filtered using an exponential moving average function to determine filtered weight sensor data 220. A block accesses a window length indicative of an interval of time. A block may access a portion of the filtered weight sensor data 220 having associated time values within a range of time values delineated by the window length. A block may use a linear regression to fit a straight line to the portion of the filtered weight sensor data 220. A block may determine a slope value of the line. A block may then determine one or more residuals, each residual comprising a difference between the filtered weight sensor data 220 at a particular time and the value of the straight line at the particular time. A block determines, based at least in part on one or more of the slope value of the line or the one or more residuals, a change in state of the weight of the lane 108. For example, the change in state may indicate a transition from an unperturbed state to a perturbed state, and vice versa.

Block 1004 determines measured weight characteristic data 524 for one or more of the lanes 108. As described above, the weight characteristic data 524 may include measured weight data 526, measured weight change data 528, measured weight distribution data 530, and so forth. In some implementations, the measured weight characteristic data 524 may be based on the weight sensor data 220 that has been processed and is thus filtered weight sensor data 220.

In implementations where each lane 108 includes a plurality of weight sensors 114(6), output from those sensors 114 may be aggregated to produce output representative of the entire lane 108. For example, the weight sensors 114(6)

(1) and 114(6)(2) that are in the same lane 108 may be summed to provide weight characteristic data 524 for that lane 108.

Block 1006 determines the lanes that are included in a cluster 806. For example, the processing module 428 may generate cluster data 532 indicative of those lanes that are included in the cluster 806 based on the measured lane weight change data 528. The cluster 806 may comprise any one or more adjacent lanes 802 that exhibit measured lane weight change data 528 that exceeds a threshold during a specified time period. For example, the threshold data 430 may specify that any measured lane weight change data 528 during a window of 300 milliseconds that is less than 10 grams is disregarded. The threshold may be fixed or dynamically adjustable. For example, the fixed threshold may be specified by an operator. In another example, a dynamically adjustable threshold may be time-dependent, such that a slowly accumulating change in measured lane weight change data 528 over several seconds may be disregarded, while the same measured lane weight change data 528 over 500 milliseconds may be considered. The determination of the cluster 806 may be omitted in some implementations. In other implementations, the determination of the cluster 806 may be based on previously stored data rather than measured lane weight change data 528.

In one implementation, the measured lane weight change data 528 for each of the lanes 108 in the cluster 806 may be summed to determine a measured total cluster weight change. The measured total cluster weight change may then be compared to a predicted total cluster weight change.

To improve accuracy of the system, the process may operate using weight sensor data 220 that is stable. For example, the measured weight characteristic data 524 may be determined based on weight sensor data 220 that is determined to be stable. In some implementations, stable weight sensor data 220 may be designated as weight sensor data 220 having values that exhibit changes below a threshold value over a specified time period. Changing weight sensor data 220 may result in the determination of the cluster 806 as described above. Detection of changes used to determine the cluster 806 may be at the level of individual lanes 108. In some implementations, the readings from a particular lane 108 may not be deemed to be stable until all of the lanes 108 within the same cluster 806 are stable. By determining stability for the cluster 806 as a whole, accuracy of the system may be improved to account for additional picks or places of items 112 that may occur at the facility 202.

Clusters 806 may change size. For example, a lane 108 may be added to an existing cluster 806 or may be designated as a new cluster 806. When an additional lane 108 is added to an existing cluster 806, the processing module 428 may check to determine if this additional lane 108 will link or connect to clusters 806 that were previously separated by one or more gap lanes 808. Two clusters 806 may thus merge into a single cluster 806. Similarly, one cluster 806 may be split into two separate clusters 806, or may be pruned into a smaller cluster 806 having fewer lanes 108 by removing one or more lanes 108.

By utilizing clusters 806, the processing module 428 is able to determine separate interactions occurring on the same shelf 104 but which occur contemporaneously in time. For example, a pick of the items 112(2) from cluster 806(2) may be determined independently of a pick of the items 112(5) from the cluster 806(5). The lanes 108 may require different times to settle due to different weights of the respective loads, geometry of the items 112 thereon, and so forth. For example, as depicted in FIG. 8 the measured weight characteristic data 524 for lanes 14 and 15 may stabilize more quickly than the way characteristic data 524 for lanes 5-8. As a result, the interaction data 230 for the cluster 806(5) may be determined and available more quickly than that for the cluster 806(2).

Block 1008 determines item data 226 for one or more items 112 associated with the shelf 104. For example, the physical layout data 228 may be accessed, and the lane IDs 516 at the cluster 806 may be used to determine physical location data 514 that is at the cluster 806. Continuing the example, the physical location data 514 may then be used to determine the shelf location ID 510, which in turn may be used to access item data 226 about a particular type of item 112 that is stowed at the shelf 104. As described above in FIG. 8, in some implementations, one or more of the items 112 may be supported by two or more of the lanes 108. For example, the item 112(2) as illustrated in FIG. 8 is supported by lanes 5-8.

Block 1010 determines one or more hypotheses. For example, the hypotheses data 434 may be accessed from the data store 420. In one implementation, each hypothesis may be indicative of one or more of the following: different combinations of one or more types of items 112 at the cluster 806; different combinations of predicted quantity of each of the one or more types of items 112 at the cluster 806; a predicted total cluster weight that differs from the measured total cluster weight change by less than a second threshold; or a predicted lane weight change for each lane 108 at the cluster 806. The total cluster weight comprises a sum of the weights of individual lanes 108 at the cluster 806.

The hypotheses data 434 may be generated or retrieved subject to one or more constraints. In one implementation, constraint data may be accessed, and the plurality of hypotheses may be generated in accordance with the one or more constraints. For example, the constraints may specify a minimum and a maximum number of items 112 that may be assumed to be interacted with. The hypotheses data 434 may thus be limited to those predicted values corresponding to interactions involving the number of items 112 between the minimum and maximum. Other constraints may include, but are not limited to, situations such as a simultaneous pick and place in the same interaction, simultaneous removal from different shelf locations 804, and so forth. Hypotheses in the hypotheses data 434 that do not comply with the constraint data may be disregarded or removed.

In some implementations, the hypotheses data 434 that is undergoing consideration as possible solutions may be limited to hypotheses that describe changes to the items 112 at the cluster 806. For example, the hypotheses data 434 associated with the cluster 806(2) may include only changes in predicted quantities of items 112(2). In another example, the hypotheses data 434 associated with the cluster 806(5) may be limited to changes in predicted quantities of items 112(4) and 112(5).

Block 1012 determines a score for one or more of the one or more hypotheses. One or more of the following scoring modules may be implemented individually, or in combination, to determine the score.

A first scoring module may determine, for at least some of the hypotheses, a difference between the predicted lane weight change and the measured lane weight change for each lane 108 in the cluster 806. For each of the hypotheses, a score may be determined based on a sum of the differences associated with that hypothesis.

An edge penalty scorer module may be used to assist in determining scores to differentiate several potential hypotheses. The edge penalty scorer module may perform one or more of the following actions.

A block determines the score for a plurality of the hypotheses is above a threshold. For example, the threshold may specify a minimum score, with that score for some of the hypotheses generated using the first scoring module described above may be used to make this assessment.

For each of the hypotheses with a score above the threshold, a block determines a first edge lane 810(1) located at a first end of the cluster 806 and a second edge lane 810(2) located at a second end of the cluster 806.

A block determines a first neighboring lane 812(1) adjacent to the first edge lane 810(1) that is outside of the cluster 806. A block determines a second neighboring lane 812(2) adjacent to the second edge lane 810(2) that is outside of the cluster 806.

A block may then change the score for each of the hypotheses that appears to involve a situation where a neighboring lane 812 was involved in an interaction or a change was predicted but not measured. The block may change the score for each of the hypotheses that satisfy one or more of the following conditions: a measured lane weight of the first neighboring lane 812(1) exceeds a fourth threshold; a measured lane weight of the second neighboring lane 812(2) exceeds the fourth threshold; the predicted lane change weight for the first edge lane 810(1) is greater than a fifth threshold and the measured lane weight of the first edge lane 810(1) is below a sixth threshold; or the predicted lane change weight for the second edge lane 810(2) is greater than the fifth threshold and the measured lane weight of the second edge lane 810(2) is below the sixth threshold. The first two conditions address the situation where a change in a measured weight characteristic data 524 of a neighboring lane 812 is considered to be significant. The fourth, fifth, and sixth thresholds may specify a particular absolute value of weight, a percentage variance, and so forth. The latter two conditions address the situation where a significant change was predicted, but was not measured.

A penalized weight scorer module may be used to assist in determining scores to differentiate several potential hypotheses. For example, the scores may be indicative of a low confidence. The penalized weight scorer module may perform one or more of the following actions.

For each of the hypotheses, a block may determine a first set of one or more lanes 108 for which a predicted lane weight exceeds a threshold. A block determines a first sum of the measured lane weight changes for the lanes 108 in the first set. A block determines a difference between the first sum and the predicted total cluster weight. A block determines a second set of one or more lanes 108 that are part of the cluster 806 and not part of the first set. A block determines a second sum of the measured lane weight changes for the lanes 108 in the second set. A block determines a third sum of the difference and the second sum. A block determines a score for one or more of the hypotheses based on the third sum.

The penalized weight scorer module may not be used in some situations. For example, if a solution includes both picks and places, the penalized weight scorer may not be used. In another example, if the scores produced by the penalized weight scorer module are within a threshold difference of one another, scores produced by the penalized weight scorer module may be omitted.

In some implementations, the score may be based at least in part on the number of transactions that a particular hypothesis involves. In one implementation, a transaction may comprise one or more of a pick to decrease a quantity of one of the one or more items 112 supported by the shelf 104, or a place to increase the quantity. A block may determine, for each of the hypotheses, a number of transactions and a count of the number of transactions. The score may then be based on the count. For example, the larger the count of transactions, the lower the score.

Block 1014 determines a solution from the one or more hypotheses. For example, the hypothesis having a score indicative of a best match or closest correspondence between the predicted and the measured values may be designated as the solution.

Determination of the solution may be based on other factors. For example, other sensor data 218 such as the non-weight sensor data 222 may be processed to determine a quantity of one or more of addition or removal of an item 112 to the inventory location 212. The determination of the solution may be based on the one of the selected hypotheses having a predicted quantity that is consistent with the determined one or more of addition or removal of an item 112. Continuing the example, where the non-weight sensor data 222 indicates removal of an item 112, the solution would be one of the selected hypotheses that represented a pick of the item 112.

Block 1016 determines interaction data 230 based on the solution. In some implementations, the determination of the interaction data 230 may be responsive to detection of the change in state in the weight sensor data 220, such as described above. For example, the interaction data 230 may be determined following a sequence of stable-unstable-stable for weight sensor data 220 provided by the shelf 104 or a portion thereof.

In one implementation, the interaction data 230 may be based on the solution. As described above, the interaction data 230 may be indicative of one or more of pick, place, touch, and so forth, of a particular quantity of an item 112 at the shelf 104 as described by the solution. For example, the interaction data 230 may be indicative of a change in quantity of one or more items 112 on the shelf 104, based on the weight characteristic data 524 and the item data 226.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a first lane and a second lane that are adjacent to one another, each lane comprising:
      a support structure to hold one or more items, and
      a weight sensor to generate weight data of a load on the support structure;
   a computing device comprising:
      a memory, storing computer-executable instructions; and
      a hardware processor to execute the computer-executable instructions to:
         access physical layout data associated with the first and second lanes;
         determine, based on the physical layout data, a cluster comprising the first lane and the second lane;
         determine a measured lane weight change for each of the first and second lanes;
         determine a measured total weight change of the cluster;
         determine a plurality of hypotheses, each hypothesis comprising:
            a predicted quantity change of the one or more items stowed at the cluster,
            a predicted lane weight change for each of the first and second lanes in the cluster, and
            a predicted total weight change of the cluster;
         determine, for each hypothesis in the plurality of hypotheses and for each of the first and second lanes in the cluster, a difference between the predicted lane weight change and the measured lane weight change;
         determine a score for the each hypothesis based on a sum of the differences;
         determine, based on the score for the each hypothesis, a change in quantity of the one or more items; and
         assess charges to an account associated with a user proximate to one or more of the first lane or the second lane based on the change in quantity of the one or more items.

2. The system of claim 1, wherein the physical layout data comprises one or more of:
   location information of the first and second lanes and the weight sensor;
   item data indicative of items stowed on the support structure of the first and second lanes,
   information indicative of an arrangement of the items on the support structure of the first and second lanes,
   a lane identifier for each of the first and second lanes, or
   an identifier for the weight sensor.

3. The system of claim 1, further comprising computer-executable instructions to:
   limit the plurality of hypotheses based on one or more constraints, the one or more constraints comprising:
      a difference threshold between the predicted total weight change of the cluster and the measured total weight change of the cluster; and
      a maximum storage capacity for the one or more items on the first and second lanes of the cluster.

4. The system of claim 1, further comprising:
   an imaging sensor; and
   wherein the computer-executable instructions are further executable to:
      determine, using the imaging sensor, that the user is proximate to one or more of the first lane or the second lane.

5. A system comprising:
   a shelf comprising a plurality of lanes that are adjacent to one another, each lane comprising:
      a weight sensor to generate weight data of a load on the each lane; and
   a computing device comprising:
      a memory, storing computer-executable instructions; and
      a hardware processor to execute the computer-executable instructions to:
         access layout data associated with the shelf;
         determine, based on the layout data, a cluster comprising adjacent lanes from the plurality of lanes;
         determine a measured lane weight change for each of the adjacent lanes in the cluster;
         determine a measured total weight change for the cluster;
         determine one or more hypotheses for one or more items associated with the adjacent lanes in the cluster, each hypothesis indicative of one or more of:
            a predicted quantity of the one or more items,
            a predicted lane weight change for the each of the adjacent lanes in the cluster, or
            a predicted total weight change for the cluster;
         determine a score for one or more of the one or more hypotheses;
         determine a solution based on the score for the one or more of the one or more hypotheses;
         determine interaction data based on the solution; and
         assess charges to an account associated with a user based on the interaction data.

6. The system of claim 5, wherein the layout data comprises one or more of:
   location information of the shelf within a facility,
   information indicative of a physical configuration of the shelf,
   item data for items stowed at the shelf,
   information indicative of an arrangement of the items on the shelf,
   a lane identifier for each of the plurality of lanes, or
   an identifier for each sensor associated with the shelf.

7. The system of claim 5, wherein the layout data comprises a planogram indicative of an arrangement of items on different lanes of the shelf.

8. The system of claim 5, further comprising computer-executable instructions to:
   determine, based on the layout data, one or more edge lanes on the shelf, wherein the one or more edge lanes comprise outermost lanes of the shelf and outermost lanes of the cluster;
   determine, based on the layout data, one or more neighboring lanes on the shelf, wherein the one or more neighboring lanes comprise lanes adjacent to the one or more edge lanes that are not associated with an item;
   determine, based on the layout data, one or more gap lanes, wherein the one or more gap lanes represent an entire lane that separates lanes occupied at least in part by an item; and
   wherein the adjacent lanes of the cluster include one or more of the edge lanes and exclude the one or more neighboring lanes and the one or more gap lanes.

9. The system of claim 5, further comprising computer-executable instructions to:
   determine a shelf location identifier from the layout data; and
   retrieve item data for the one or more items associated with the adjacent lanes in the cluster, based on the shelf location identifier.

10. The system of claim 5, further comprising computer-executable instructions to:
    sum the measured lane weight change for the each of the adjacent lanes in the cluster to determine the measured total weight change for the cluster.

11. The system of claim 10, further comprising computer-executable instructions to:
    determine, for the each hypothesis, a difference between the predicted lane weight change and the measured lane weight change for the each of the adjacent lanes in the cluster;
    wherein the score is determined based on a sum of the differences associated with the each hypothesis.

12. The system of claim 10, further comprising computer-executable instructions to:
    determine, for the each hypothesis, a first set of one or more lanes for which the predicted lane weight change exceeds a threshold;
    determine a first sum of the measured lane weight changes for the one or more lanes in the first set;
    determine a difference between the first sum and the predicted total weight change for the cluster;
    determine a second set of one or more lanes that are part of the cluster and not part of the first set;
    determine a second sum of the measured lane weight changes for the one or more lanes in the second set;
    determine a third sum of the difference and the second sum; and
    determine the score for the one or more of the one or more hypotheses based on the third sum.

13. The system of claim 10, further comprising computer-executable instructions to:
    determine, for the each hypothesis, a number of transactions, wherein a transaction comprises one or more of a pick to decrease a quantity of one of the one or more items supported by the shelf or a place to increase the quantity;
    determine a count of the number of transactions for the each hypothesis; and
    wherein the solution is further based at least in part on the count.

14. The system of claim 5, wherein:
    the interaction data indicates a change in quantity of the one or more items on the adjacent lanes in the cluster; and
    the charges to the account associated with the user are assessed based on the change in quantity of the one or more items on the adjacent lanes in the cluster.

15. The system of claim 5, further comprising:
    an image sensor to generate image data associated with the shelf; and
    wherein the computer-executable instructions are further executable to:
        determine, using the image data, that the user is proximate to the shelf.

16. A method comprising:
    accessing layout data associated with a shelf;
    determining, based on the layout data, a cluster comprising adjacent lanes from a plurality of lanes on a shelf;
    accessing weight data indicative of a weight as measured at each of the adjacent lanes of the cluster;
    determining a measured total weight change of the cluster;
    accessing one or more hypotheses associated with one or more items stowed at the cluster, each hypothesis comprising:
        a predicted total weight change of the cluster that differs from the measured total weight change of the cluster by a threshold value;
    determining, for one or more of the one or more hypotheses, a difference between the measured total weight change of the cluster and the predicted total weight change of the cluster;
    determining a solution from the one or more hypotheses;
    generating interaction data based on the solution; and
    generating billing information for an account associated with a user based on the interaction data.

17. The method of claim 16, wherein the layout data comprises a planogram indicative of an arrangement of items on different lanes of the shelf.

18. The method of claim 16, further comprising:
    determining measured weight characteristic data for the plurality of lanes of the shelf, the measured weight characteristic data comprising one or more of:
        a measured weight for each of the plurality of lanes;
        a measured weight change at the each of the plurality of lanes from a first time to a second time; and
        a weight distribution between two or more of the plurality of lanes of the shelf; and
    wherein the one or more hypotheses further include:
        a predicted quantity of the one or more items, and
        a predicted weight characteristic at each of the adjacent lanes of the cluster.

19. The method of claim 16, further comprising:
    summing a measured weight change at each of the adjacent lanes of the cluster to determine the measured total weight change of the cluster.

20. The method of claim 16, further comprising:
  detecting that the user is proximate to a shelf, using an imaging sensor;
  determining a quantity of the one or more items removed from the cluster; and
  wherein the billing information for the account associated with the user is generated based on the quantity of the one or more items removed from the shelf.

* * * * *

UNITED STATES PATENT AND TRADEMARK OFFICE
CERTIFICATE OF CORRECTION

PATENT NO. : 10,679,181 B1
APPLICATION NO. : 16/383391
DATED : June 9, 2020
INVENTOR(S) : Alexander Clark Prater et al.

It is certified that error appears in the above-identified patent and that said Letters Patent is hereby corrected as shown below:

In the Claims

Column 37, Claim 11, Line 48:
Currently reads: "cluster;".
Where it should read: --cluster; and--.

Column 38, Claim 16, Line 29:
Currently reads: "adjacent lanes from a plurality of lanes on a shelf;".
Where it should read: --adjacent lanes from a plurality of lanes on the shelf;--.

Signed and Sealed this
Fourteenth Day of July, 2020

Andrei Iancu
*Director of the United States Patent and Trademark Office*